(12) United States Patent
Andersen et al.

(10) Patent No.: US 8,250,037 B2
(45) Date of Patent: Aug. 21, 2012

(54) SHARED DRIVE DATA COLLECTION TOOL FOR AN ELECTRONIC DISCOVERY SYSTEM

(75) Inventors: David M. Andersen, Charlotte, NC (US); Emerson D. Miller, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 125 days.

(21) Appl. No.: 12/627,996

(22) Filed: Nov. 30, 2009

(65) Prior Publication Data

US 2010/0250531 A1    Sep. 30, 2010

Related U.S. Application Data

(60) Provisional application No. 61/164,276, filed on Mar. 27, 2009.

(51) Int. Cl.
  *G06F 7/00*       (2006.01)
  *G06F 17/30*      (2006.01)
(52) U.S. Cl. ......................................... 707/641; 707/802
(58) Field of Classification Search ................... 707/641
  See application file for complete search history.

(56) References Cited

U.S. PATENT DOCUMENTS

| | | | |
|---|---|---|---|
| 6,119,137 A | 9/2000 | Smith et al. | |
| 6,601,108 B1 | 7/2003 | Marmor | |
| 6,658,625 B1 | 12/2003 | Allen | |
| 6,941,361 B1 | 9/2005 | Fink et al. | |
| 7,076,543 B1 | 7/2006 | Kirti et al. | |
| 7,124,249 B1* | 10/2006 | Darcy | 711/122 |
| 7,134,020 B2 | 11/2006 | Eagle et al. | |
| 7,376,969 B1 | 5/2008 | Njemanze et al. | |
| 7,451,103 B1 | 11/2008 | Boyle et al. | |
| 7,451,139 B2 | 11/2008 | Namba | |
| 7,765,181 B2 | 7/2010 | Thomas et al. | |
| 7,895,229 B1 | 2/2011 | Paknad | |
| 8,073,729 B2 | 12/2011 | Kisin et al. | |
| 2002/0194097 A1 | 12/2002 | Reitz | |
| 2002/0198629 A1 | 12/2002 | Ellis | |
| 2003/0154199 A1 | 8/2003 | Thomas et al. | |
| 2003/0182375 A1 | 9/2003 | Zhu et al. | |

(Continued)

FOREIGN PATENT DOCUMENTS

EP    1093068 A2    4/2001

(Continued)

OTHER PUBLICATIONS

Singapore Patent Application No. 201002142-6 Search Report and Written Opinion mailed Sep. 5, 2011.

(Continued)

*Primary Examiner* — Kuen Lu
(74) *Attorney, Agent, or Firm* — Michael A. Springs; Moore and Van Allen, PLLC; Padowithz Alce

(57) ABSTRACT

Embodiments of the invention relate to systems, methods, and computer program products for improved electronic discovery. Embodiments herein disclosed provide for an enterprise wide electronic management server that provides for data to be identified, located, retrieved, preserved, searched, reviewed and produced in an efficient and cost-effective manner across the entire enterprise system. In addition, by structuring management of e-discovery based on case/matter, custodian and data and providing for linkage between the same, further efficiencies are realized in terms of identifying, locating and retrieving data and leveraging results of previous e-discoveries with current requests.

42 Claims, 14 Drawing Sheets

U.S. PATENT DOCUMENTS

| | | | |
|---|---|---|---|
| 2003/0200308 A1 | 10/2003 | Tameda et al. | |
| 2004/0098424 A1* | 5/2004 | Seidenberg et al. | 707/204 |
| 2004/0260733 A1 | 12/2004 | Adelstein et al. | |
| 2005/0086720 A1 | 4/2005 | Shimizu et al. | |
| 2005/0152235 A1 | 7/2005 | Hoshizawa | |
| 2005/0177527 A1 | 8/2005 | Morris et al. | |
| 2006/0095795 A1 | 5/2006 | Nakamura et al. | |
| 2006/0167877 A1 | 7/2006 | Lee et al. | |
| 2006/0256739 A1 | 11/2006 | Seier et al. | |
| 2007/0027974 A1 | 2/2007 | Lee et al. | |
| 2007/0073894 A1 | 3/2007 | Erickson et al. | |
| 2007/0088754 A1 | 4/2007 | Brannon et al. | |
| 2007/0112783 A1 | 5/2007 | McCreight et al. | |
| 2007/0162547 A1 | 7/2007 | Ross | |
| 2007/0208918 A1 | 9/2007 | Harbin et al. | |
| 2007/0226170 A1 | 9/2007 | Sun | |
| 2007/0271517 A1 | 11/2007 | Finkelman et al. | |
| 2007/0288579 A1 | 12/2007 | Schunemann | |
| 2008/0027895 A1 | 1/2008 | Combaz | |
| 2008/0046260 A1 | 2/2008 | Ghielmetti et al. | |
| 2008/0061146 A1 | 3/2008 | Komaki | |
| 2008/0082672 A1 | 4/2008 | Garrett | |
| 2008/0168145 A1 | 7/2008 | Wilson | |
| 2008/0252936 A1 | 10/2008 | Stratton | |
| 2008/0288479 A1 | 11/2008 | Paknad et al. | |
| 2008/0294492 A1 | 11/2008 | Simpson et al. | |
| 2009/0001162 A1 | 1/2009 | Asher et al. | |
| 2009/0006973 A1 | 1/2009 | Newell et al. | |
| 2009/0043819 A1 | 2/2009 | Searl et al. | |
| 2009/0132262 A1 | 5/2009 | Paknad | |
| 2009/0164522 A1 | 6/2009 | Fahey | |
| 2009/0165026 A1 | 6/2009 | Paknad et al. | |
| 2009/0183253 A1 | 7/2009 | Kates | |
| 2009/0286219 A1 | 11/2009 | Kisin et al. | |
| 2010/0017239 A1 | 1/2010 | Saltzman et al. | |
| 2010/0033750 A1 | 2/2010 | Tischler et al. | |
| 2010/0082382 A1 | 4/2010 | Kisin et al. | |
| 2010/0082555 A1 | 4/2010 | Ogawa et al. | |
| 2010/0205020 A1 | 8/2010 | Losey | |
| 2010/0223108 A1 | 9/2010 | Quinn, Jr. | |
| 2011/0040600 A1 | 2/2011 | Paknad et al. | |
| 2011/0173033 A1 | 7/2011 | Paknad et al. | |

FOREIGN PATENT DOCUMENTS

| | | | |
|---|---|---|---|
| EP | 1349089 A2 | 1/2003 | |
| WO | 01/27765 A1 | 4/2001 | |
| WO | 2002010967 A2 | 2/2002 | |
| WO | 02071192 A2 | 9/2002 | |
| WO | 03/065256 A1 | 8/2003 | |
| WO | 2004092902 A2 | 10/2004 | |
| WO | 2006001833 A2 | 1/2006 | |
| WO | 2006031836 A2 | 3/2006 | |
| WO | WO 2006/031836 A2 | 3/2006 | |
| WO | 2006052441 A2 | 5/2006 | |
| WO | 2007/044709 A2 | 4/2007 | |
| WO | 2007076515 A2 | 7/2007 | |
| WO | WO 2007/076515 | 7/2007 | |
| WO | 2008009991 A1 | 1/2008 | |
| WO | 2008070415 A2 | 6/2008 | |
| WO | WO 2008/070415 A2 | 6/2008 | |

OTHER PUBLICATIONS

Singapore Patent Application No. 201002144-2 Search Report and Written Opinion mailed Sep. 5, 2011.
Singapore Patent Application No. 201002140-0 Search Report and Written Opinion mailed Sep. 27, 2011.
U.S. Appl. No. 12/534,375, filed Aug. 3, 2009.
U.S. Appl. No. 12/614,059, filed Nov. 6, 2009.
U.S. Appl. No. 12/618,430, filed Nov. 13, 2009.
U.S. Appl. No. 12/618,443, filed Nov. 13, 2009.
U.S. Appl. No. 12/627,791, filed Nov. 30, 2009.
U.S. Appl. No. 12/627,890, filed Nov. 30, 2009.
U.S. Appl. No. 12/696,653, filed Jan. 29, 2010.
U.S. Appl. No. 12/702,641, filed Feb. 9, 2010.
U.S. Appl. No. 12/729,987, filed Mar. 23, 2010.
U.S. Appl. No. 12/730,780, filed Mar. 24, 2010.
U.S. Appl. No. 12/730,785, filed Mar. 24, 2010.
U.S. Appl. No. 12/730,790, filed Mar. 24, 2010.
U.S. Appl. No. 12/730,792, filed Mar. 24, 2010.
U.S. Appl. No. 12/730,799, filed Mar. 24, 2010.
U.S. Appl. No. 12/730,807, filed Mar. 24, 2010.
U.S. Appl. No. 12/730,818, filed Mar. 24, 2010.
U.S. Appl. No. 12/730,821, filed Mar. 24, 2010.
U.S. Appl. No. 12/730,840, filed Mar. 24, 2010.
U.S. Appl. No. 12/730,848, filed Mar. 24, 2010.
U.S. Appl. No. 12/730,851, filed Mar. 24, 2010.
U.S. Appl. No. 12/731,657, filed Mar. 25, 2010.
J. Barlow, L. Bean and D.D. Hott: "Employee 'Spy' Software: Should You Use It?" The Journal of Corporate Accounting & Finance, Document No. XP-00260145, pp. 7-12; Retrieved from the Internet: URL: http://onlinelibrary.wiley.com/10_1002/icaf.10162/abstract [retrieved on Sep. 17, 2010].
Dan Manson et al.: "Is the Open Way a Better Way? Digital Forensics using Open Source Tools", Proceedings of the $40^{th}$ Hawaii International Conference on System Sciences-2007 [dated Jan. 1, 2007]; 10 pages total.
Anonymous: "EDRM LegalTech 2009 Luncheon Presentation", E.D.R.M.—The Electronic Discovery Reference Model; Document No. XP-002601404 LegalTech Lunch & Learn, Feb. 3, 2009, LegalTech New York; Retrieved from the Internet: URL:http//edrm.net/002/wp-content/uploads/2009/09/EDRM_LegalTech.pdf [retrieved Sep. 17, 2010].
Extended European Search Report dated Sep. 22, 2010 for European Application No. EP 10 25 0591.
Ciravegna et al.: "User-System Cooperation in Document Annotation based on Information Extraction" 2002. Proceedings of the 13th International Conference on Knowledge Engineering and Knowledge Management.
Buchholz et al.: "On the Role of File System Metadata in Digital Forensics", Journal of Digital Investigation, vol. 1(4), pp. 297-308, Dec. 1, 2004.
Golden et al. Scalpel: "A Frugal, High Performance File Carver" 2005 Digital Forensic Research Workshop (DFRWS) New Orleans, LA.
Manson et al.: "Is the Open Way a Better Way? Digital Forensics using Open Source Tools". System Sciences, 2007. HICSS 2007. 40th Annual Hawaii International Conference On, IEEE, PI, Jan. 1, 2007. ISBN:978-0-7695-2755-0.
Berinato: "The Rise of Anti-Forensics" http/www.csoonline.com/article/print/221208. Jun. 8, 2007.
Anonymous: "EDRM LegalTech 2009 Luncheon Presentation" E.D.R.M. The Electronic Discovery Reference Model Feb. 9, 2009. Retrieved from the Internet: http://www.edrm.net/wp-content/plugins/download-monitor/download.php? id=6.
Singapore Patent Application No. 201002126-9 Search Report and Written Opinion mailed Aug. 3, 2011.
Singapore Patent Application No. 201002129-3 Search Report and Written Opinion mailed Aug. 3, 2011.
Singapore Patent Application No. 201002128-5 Search Report and Written Opinion mailed Aug. 3, 2011.
Singapore Patent Application No. 201002139-2 Search Report and Written Opinion mailed Aug. 3, 2011.
Singapore Patent Application No. 201002137-6 Search Report and Written Opinion mailed Aug. 15, 2011.
Singapore Patent Application No. 201002138-4 Search Report and Written Opinion mailed Aug. 19, 2011.
Singapore Patent Application No. 201002125-1 Search Report and Written Opinion mailed Aug. 24, 2011.
Singapore Patent Application No. 201002134-3 Search Report and Written Opinion mailed Aug. 25, 2011.
Singapore Patent Application No. 201002124-4 Search Report and Written Opinion mailed Aug. 25, 2011.
SysTools Software, "Export Notes—Notes Email Migration Tool", 2008, available online: http://web.archive.org/web/20080201104418/http://www.exportlotusnotes.com/export-notes.
Process Text Group, "ABC Amber BlackBerry Converter", 2008, available online: http:web.archive.org/web/20080302025411/http://www.processtext.com/abcblackberry.html.

Search Report and Written Opinion for Singapore Application No. 201002122-8 mailed Jan. 3, 2012.
Search Report and Written Opinion for Singapore Application No. 201002141-8 mailed Jan. 3, 2012.
Search Report and Written Opinion for Singapore Application No. 201002143-4 mailed Jan. 3, 2012.
Search Report and Written Opinion for Singapore Application No. 201002120-2 mailed Feb. 10, 2012.
Second Written Opinion for Singapore Application No. 201002126-9 mailed Mar. 14, 2012.
Second Written Opinion for Singapore Application No. 201002128-5 mailed Mar. 14, 2012.
Second Written Opinion for Singapore Application No. 201002129-3 mailed Mar. 14, 2012.
Second Written Opinion for Singapore Application No. 201002139-2 mailed mar. 14, 2012.
Danish Patent and Trademark Office. Singapore Examination Report mailed Mar. 15, 2012. Applicant: Bank of America Corporation. Singapore Patent Application No. 201002134-3. DKPTO SE No. SE 2012 00392v. English Language. 10 pages. Date of Examination Report: Mar. 12, 2012.
Danish Patent and Trademark Office. Singapore Examination Report mailed Mar. 15, 2012. Applicant: Bank of America Corporation. Singapore Patent Application No. 201002124-4. DKPTO SE No. SE 2012 00392y. English Language. 10 pages. Date of Examination Report: Mar. 12, 2012.
Second Written Opinion for Singapore Application No. 201002137-6 mailed Mar. 21, 2012.
European Office Action for Application No. 10250576.5 dated Apr. 25, 2012.
European Office Action for Application No. 10250591.4 dated Apr. 25, 2012.
European Office Action for Application No. 10250581.5 dated Apr. 25, 2012.
European Office Action for Application No. 10250586.4 dated Apr. 25, 2012.
European Office Action for Application No. 10250590.6 dated Apr. 25, 2012.
European Office Action for Application No. 10250580.7 dated Apr. 25, 2012.
European Office Action for Application No. 10250577.3 dated Apr. 25, 2012.
European Office Action for Application No. 10250578.1 dated Apr. 25, 2012.
European Office Action for Application No. 10250582.3 dated Apr. 26, 2012.
European Office Action for Application No. 10250583.1 dated Apr. 26, 2012.
European Office Action for Application No. 10250587.2 dated Apr. 27, 2012.
Second Written Opinion for Singapore Application No. 201002138-4 dated Apr. 5, 2012.
European Office Action for Application No. 10250585.6 dated Apr. 26, 2012.
European Office Action for Application No. 10250579.9 dated Apr. 26, 2012.
European Office Action for Application No. 10250584.9 dated Apr. 26, 2012.
European Office Action for Application No. 10250589.8 dated Apr. 25, 2012.
European Patent Office. European Office Action dated Apr. 26, 2012. European Application No. 10 250 585.6. Name of Applicant: Bank of America Corporation. English Language. 10 pages.
European Patent Office. European Office Action dated Apr. 26, 2012. European Application No. 10 250 589.8. Name of Applicant: Bank of America Corporation. English Language. 10 pages.
European Patent Office. European Office Action dated Apr. 26, 2012. European Application No. 10 250 579.9. Name of Applicant: Bank of America Corporation. English Language. 10 pages.
European Patent Office. European Office Action dated Apr. 26, 2012. European Application No. 10 250 584.9. Name of Applicant: Bank of America Corporation. English Language. 10 pages.
European Patent Office. European Office Action dated Apr. 25, 2012. European Application No. 10 250 586.4. Name of Applicant: Bank of America Corporation. English Language. 10 pages.
European Patent Office. European Office Action dated Apr. 25, 2012. European Application No. 10 250 581.5. Name of Applicant: Bank of America Corporation. English Language. 10 pages.
European Patent Office. European Office Action dated Apr. 25, 2012. European Application No. 10 250 576.5. Name of Applicant: Bank of America Corporation. English Language. 11 pages.
European Patent Office. European Office Action dated Apr. 27, 2012. European Application No. 10 250 587.2. Name of Applicant: Bank of America Corporation. English Language. 10 pages.
European Patent Office. European Office Action dated Apr. 25, 2012. European Application No. 10 250 577.3. Name of Applicant: Bank of America Corporation. English Language. 10 pages.
European Patent Office. European Office Action dated Apr. 25, 2012. European Application No. 10 250 580.7. Name of Applicant: Bank of America Corporation. English Language. 10 pages.
European Patent Office. European Office Action dated Apr. 25, 2012. European Application No. 10 250 590.6. Name of Applicant: Bank of America Corporation. English Language. 10 pages.
European Patent Office. European Office Action dated Apr. 26, 2012. European Application No. 10 250 582.3. Name of Applicant: Bank of America Corporation. English Language. 10 pages.
Great Britain Intellectual Property Office. GB Examination Report dated Apr. 23, 2012. Great Britain Application No. GB1108090.0. Name of Applicant: Bank of America Corporation. English Language. 3 pages.
Hewlett Packard. "*HP OpenView Storage Data Protector Concepts Guide.*" Release A.06.00. Manufacturing Part Number: B6960-96001. English Language. Jul. 2006.
Hungarian Intellectual Property Office. Written Opinion mailed Apr. 5, 2012. Hungary Application No. 201002137-6. Name of Applicant: Bank of America Corporation. English Language. 8 pages. Date of Written Opinion: Mar. 21, 2012.
Hungarian Intellectual Property Office. Written Opinion mailed Apr. 5, 2012. Hungary Application No. 201002138-4. Name of Applicant: Bank of America Corporation. English Language. 8 pages. Date of Written Opinion: Mar. 29, 2012.

* cited by examiner

SHARED DRIVE DATA COLLECTION TOOL FOR AN ELECTRONIC DISCOVERY SYSTEM

CLAIM OF PRIORITY UNDER 35 U.S.C. §119

The present Application for Patent claims priority to Provisional Application No. 61/164,276 entitled "Electronic Discovery System" filed Mar. 27, 2009, and assigned to the assignees hereof and hereby expressly incorporated by reference herein.

FIELD

In general, embodiments of the invention relate to methods, systems and computer program products for electronic discovery and, more particularly, managing the collection of data from custodians in an enterprise.

BACKGROUND

Electronic discovery, commonly referred to as e-discovery, refers to any process in which electronic data is sought, located, secured and searched with the intent of using it as evidence in a legal proceeding, an audit, a securities investigation, a forensics investigation or the like. E-discovery can be carried out offline on a particular computer or it can be accomplished in a network environment.

The nature of digital data makes it extremely well-suited for investigation. In particular, digital data can be electronically searched with ease, whereas paper documents must be scrutinized manually. Furthermore, digital data is difficult or impossible to completely destroy, particularly if the data is stored in a network environment. This is because the data appears on multiple hard drives, and because digital files, even if deleted, generally can be undeleted. In fact, the only reliable means of destroying digital data is to physically destroy any and all hard drives where it is stored.

In the process of electronic discovery, data of all types can serve as evidence. This can include text, image, calendar event data, databases, spreadsheets, audio files, multimedia files, web sites and computer programs. Electronic mail (i.e., e-mail) can be an especially valuable source of evidence in civil or criminal litigation, because people are often less careful in these exchanges than in hard copy correspondence such as written memos or postal letters.

E-discovery is an evolving field that goes far beyond mere technology. It gives rise to multiple issues, many of which have yet to be resolved. For example, identifying data required to satisfy a given discovery request, locating the appropriate set of data that has been identified, and retrieving the data once it has been identified and located all pose problems in and of themselves. This is especially evident if the data that is being identified, located and retrieved comes from an evolving or disparate enterprise, such as a corporation that has experienced mergers, acquisitions, downsizing and the like. Mergers and acquisitions mean that the technology infrastructure across the enterprise may vary, at least in the interim. However, e-discovery must be able to locate and retrieve data from these disparate technology infrastructures in a timely fashion, sometimes within days of when the merger/acquisition occurs.

In addition to identifying, locating and retrieving digital data, the most critical part of any electronic discovery is the preservation of data, which involves maintaining an original source copy and storing it for preservation purposes or further processing. This too becomes a daunting task for the enterprise system that encompasses a myriad of different technology infrastructures and the like. Therefore, a need exists to improve the identification, location, retrieval and preservation processes, especially in instances in which the enterprise system includes disparate technology infrastructures and the like.

As previously noted, e-discovery, as opposed to conventional discovery of printed materials, provides for the ability to filter or search the data so as to reduce the volume of data to only that which is relevant to the request. Such searching is typically accomplished by determining a specific date range for the request, providing key words relevant to the case and the like. Improvements in the area of searching are greatly in need to further add efficiency to the overall e-discovery process.

Once data has been retrieved, preserved and, in some instances, searched the electronic data may be reviewed by the requesting entity, such as a law firm, securities commission or the like. While large requests are generally suited for online review, the manner in which the data is presented for review adds efficiency to the review process and ultimately drives the cost of the review process. Therefore, improvements in the manner in which data is presented for review are also desirable as a means of increasing efficiency and reducing costs.

Lastly, once the digital data has been reviewed, data identified as relevant may need to be produced in a tangible format for further analysis or legal evidentiary purposes. The produced documents must be properly identified and include necessary redactions and confidentiality markings.

Up until now, e-discovery management has been conducted on a case-by-case basis, meaning all tasking and workflow related to the e-discovery is based at the case level. Such management does not allow for finer granularity in the management of a case or for links to exist between different cases for the purpose of leveraging the e-discovery related to one case to another new or pre-existing case. Therefore, a need exists to improve the manner in which cases are managed and, in particular, how tasking and workflow are managed depending on case requirements and the like.

SUMMARY

Embodiments of the invention relate to systems, methods, and computer program products for electronic discovery and, in particular, improvements in electronic discovery that allow for electronic discovery to be efficiently and cost-effectively employed across a diverse enterprise.

Generally, one embodiment of the invention is a data collection tool, also described herein as a discovery site collector tool, which is used for identifying and gathering data located on shared drives, such as third party shared drives. An e-discovery manager, through the use of the electronic discovery system, sends an inquiry to a custodian (e.g. a user of computer systems within an entity that may have data necessary for discovery) requesting the location of data on any shared drives. If any data exists, the custodian will respond by sending a location identifier to the e-discovery manager indicating the node location at which the data is located on the shared drive. In some embodiments this identifier is a uniform resource locator ("URL"), or in other embodiments the identifier is an assigned identification number or other location identifier that provides the data collection tool with the location of the data. The data collection tool, through the use of the location identifier, is configured to capture the data, which includes the data at the identified node location, as well as all of the data stored under that node location within the hierarchal structure of the shared drive. In some embodiments the data is not usable in its captured state, especially if it is located on third party shared drives. Therefore, the data collection tool will also capture metadata associated with the data and reconstruct the data into the proper form so it can be used by the electronic discovery system.

One embodiment of the invention is a method of collecting data from a shared drive for an electronic discovery system. The method comprises identifying the location of data at a node in a shared drive, wherein the data is data at the node location and all of the associated hierarchal data located below the node, using a processing device operatively coupled to a memory device and a communication device, and configured to execute computer-readable program code. The method further comprises capturing the data from the shared drive using the processing device and transferring the data to the electronic discovery system using the processing device.

In further accord with an embodiment of the invention the method comprises identifying metadata associated with the data captured from the shared drive using the processing device. The method further comprises capturing the metadata associated with the data captured from the shared drive using the processing device. Thereafter, reconstructing the data captured from the shared drive into accessible data for the electronic discovery system by utilizing the information contained in the metadata using the processing device.

In accordance with another embodiment of the invention reconstructing the data captured from the shared drive into accessible data further comprises renaming the file names of the data captured into names that are consistent with and searchable by the electronic discovery system.

In yet another embodiment of the invention the method further comprises sending an inquiry to a custodian requesting the location of the data on the shared drive using the processing device.

In accordance with another embodiment of the invention the method further comprises receiving from a custodian a location identifier indicating the node location of the data on the shared drive using the processing device.

In further accord with an embodiment of the invention the method further comprises identifying links to other data located outside of and associated with the data captured using the processing device.

In accordance with another embodiment of the invention the method further comprises sending a follow up inquiry to a custodian presenting the links to the other data to the custodian using the processing device, wherein the custodian is asked if the other data should be captured.

In yet another embodiment of the invention the method further comprises receiving from a custodian information indicating whether the other data should be captured and transferred to the electronic discovery system using the processing device.

Another embodiment of the invention is a method of collecting data from a shared drive for an electronic discovery system. The method comprises identifying metadata associated with data captured from a shared drive, using a processing device operatively coupled to a memory device and a communication device, and configured to execute computer-readable program code. The method further comprises capturing the metadata associated with the data captured from the shared drive, using the processing device. Thereafter, the method comprises reconstructing the data captured from the shared drive into accessible data for the electronic discovery system by utilizing the information contained in the metadata, using the processing device.

In further accord with an embodiment of the invention reconstructing the data captured from the shared drive into accessible data further comprises renaming the file names of the data captured into names that are consistent with and searchable by the electronic discovery system.

In accordance with another embodiment of the invention the method further comprises using a processing device for identifying the location of the data at the node in the shared drive, wherein the data captured is data at a node location and all of the associated hierarchal data located below the node. The method further comprises capturing the data from the shared drive, using the processing device. Thereafter the method comprises transferring the data to the electronic discovery system using the processing device.

In yet another embodiment of the invention the method further comprises sending an inquiry to a custodian requesting the location of the data on the shared drive, using the processing device.

In further accord with an embodiment of the invention the method comprises receiving from a custodian a location identifier indicating a node location of the data on the shared drive, using the processing device.

In accordance with another embodiment of the invention the method further comprises identifying links to other data located outside of and associated with the data captured, using the processing device.

In further accord with an embodiment of the invention the method comprises sending a follow up inquiry to a custodian presenting the links to the other data to the custodian using the processing device, wherein the custodian is asked if the other data associated with the links should be captured.

In yet another embodiment of the invention the method comprises receiving from a custodian information indicating whether the other data should be captured and transferred to the electronic discovery system, using the processing device.

Another embodiment of the invention is a collection tool system for collecting data from a shared drive for an electronic discovery system, comprising a memory device, a communication device, and a processing device. The processing device is operatively coupled to the memory device and the communication device, and configured to execute computer-readable program code to identify the location of the data at a node in a shared drive, wherein the data is the data at the node and all of the associated hierarchal data located below the node. The processing device is further configured to execute computer-readable program code to capture the data from the shared drive and transfer the data to the electronic discovery system.

In further accord with an embodiment of the invention the processing device is further configured to execute computer-readable program code to identify metadata associated with the data captured from the shared drive. The processing device is further configured to execute computer-readable program code to capture the metadata associated with the data from the shared drive. The processing device is further configured to execute computer-readable program code to reconstruct the data captured from the shared drive into accessible data for the electronic discovery system by utilizing the information contained in the metadata.

In accordance with another embodiment of the invention the processing device configured to reconstruct the data captured from the shared drive into accessible data for the electronic discovery system is configured to execute computer-readable program code to rename the file names of the data captured into names that are consistent with and searchable by the electronic discovery system.

In yet another embodiment of the invention the processing device is further configured to execute computer-readable program code to send an inquiry to a custodian requesting the location of the data on the shared drive.

In further accord with an embodiment of the invention the processing device is further configured to execute computer-readable program code to receive from a custodian a location identifier indicating the node location of the data on the shared drive.

In accordance with another embodiment of the invention the processing device is further configured to execute computer-readable program code to identify links to other data located outside of and associated with the data captured.

In further accord with an embodiment of the invention the processing device is further configured to execute computer-readable program code to send a follow up inquiry to a custodian presenting the links to the other data to the custodian, wherein the custodian is asked if the other data should be captured.

In yet another embodiment of the invention the processing device is further configured to execute computer-readable program code to receive from a custodian information indicating whether the other data associated with the links should be captured and transferred to the electronic discovery system.

Another embodiment of the invention is a collection tool system for collecting data from a shared drive for an electronic discovery system comprising a memory device, a communication device, and a processing device. The processing device is operatively coupled to the memory device and the communication device, and configured to execute computer-readable program code to identify metadata associated with the data captured from the shared drive. The processing device is further configured to execute computer-readable program code to capture the metadata associated with the data from the shared drive. The processing device is further configured to execute computer-readable program code to reconstruct the data captured from the shared drive into accessible data for the electronic discovery system by utilizing the information contained in the metadata.

In further accord with an embodiment of the invention the processing device configured to reconstruct the data captured from the shared drive into accessible data for the electronic discovery system is configured to execute computer-readable program code to rename the file names of the data captured into names that are consistent with and searchable by the electronic discovery system.

In accordance with another embodiment of the invention the processing device is further configured to execute computer-readable program code to identify the location of data at a node in the shared drive, wherein the data is the data at a node location and all of the associated hierarchal data located below the node. The processing device is further configured to execute computer-readable program code to capture the data from the shared drive. The processing device is further configured to execute computer-readable program code to transfer the data to the electronic discovery system.

In yet another embodiment of the invention the processing device is further configured to execute computer-readable program code to send an inquiry to a custodian requesting the location of the data on the shared drive, using the processing device.

In accordance with another embodiment of the invention the processing device is further configured to execute computer-readable program code to receive from a custodian a location identifier indicating a node location of the data on the shared drive.

In further accord with an embodiment of the invention the processing device is further configured to execute computer-readable program code to identify links to other data located outside of and associated with the data captured.

In accordance with another embodiment of the invention the processing device is further configured to execute computer-readable program code to send a follow up inquiry to a custodian presenting the links to the other data to the custodian, wherein the custodian is asked if the other data should be captured.

In yet another embodiment of the invention the processing device is further configured to execute computer-readable program code to receive from a custodian information indicating whether the other data should be captured and transferred to the electronic discovery system.

Another embodiment of the invention is computer program product for a collection tool system for collecting data from a shared drive for an electronic discovery system. The computer program product comprising at least one computer-readable medium having computer-readable program code portions embodied therein. The computer-readable program code portions comprising an executable portion configured for identifying the location of data at a node in a shared drive, wherein the data is the data at the node location and all of the associated hierarchal data located below the node, using a processing device operatively coupled to a memory device and a communication device. An executable portion configured for capturing the data from the shared drive, using the processing device. An executable portion configured for transferring the data to the electronic discovery system using the processing device.

In further accord with an embodiment of the invention the computer program product further comprises an executable portion configured for identifying metadata associated with the data captured from the shared drive, using the processing device. An executable portion configured for capturing the metadata associated with the data captured from the shared drive, using the processing device. An executable portion configured for reconstructing the data captured from the shared drive into accessible data for the electronic discovery system by utilizing the information contained in the metadata, using the processing device.

In accordance with another embodiment of the invention the executable portion configured for reconstructing the data captured from the shared drive into accessible data, comprises an executable portion configured for renaming the file names of the data captured into names that are consistent with and searchable by the electronic discovery system.

In yet another embodiment of the invention the computer program product further comprises an executable portion configured for sending an inquiry to a custodian requesting the location of the data on the shared drive, using the processing device.

In accordance with another embodiment of invention the computer program product further comprises an executable portion configured for receiving from a custodian a location identifier indicating the node location of the data on the shared drive, using the processing device.

In further accord with an embodiment of the invention the computer program product further comprises an executable portion configured for identifying links to other data located outside of and associated with the data, using the processing device.

In yet another embodiment of the invention the computer program product further comprises an executable portion configured for sending a follow up inquiry to a custodian presenting the links to the other data to the custodian using the processing device, wherein the custodian is asked if the other data should be captured.

In accordance with another embodiment of the invention the computer program product further comprises receiving from a custodian information indicating whether the other data should be captured and transferred to the electronic discovery system, using the processing device.

Another embodiment of the invention is a computer program product for a collection tool system for collecting data from a shared drive for an electronic discovery system. The computer program product comprising at least one computer-readable medium having computer-readable program code portions embodied therein. The computer-readable program code portions comprising an executable portion configured for identifying metadata associated with the data captured from the shared drive, using the processing device operatively coupled to a memory device and a communication device. An executable portion configured for capturing the metadata associated with the data from the shared drive, using the processing device. An executable portion configured for reconstructing the data captured from the shared drive into accessible data for the electronic discovery system by utilizing the information contained in the metadata, using the processing device.

In further accord with an embodiment of the invention the executable portion configured for reconstructing the data captured from the shared drive into accessible data, comprises an executable portion configured for renaming the file names of the data captured into names that are consistent with and searchable by the electronic discovery system.

In accordance with another embodiment of the invention the computer program product further comprises an executable portion configured for identifying the location of the data at the node in the shared drive, wherein the data is the data at a node location and all of the associated hierarchal data located below the node, using the processing device. An executable portion configured for capturing the data from the shared drive, using the processing device. An executable portion configured for transferring the data to the electronic discovery system using the processing device.

In yet another embodiment of the invention the computer program product further comprises an executable portion configured for sending an inquiry to a custodian requesting the location of the data on the shared drive, using the processing device.

In accordance with another embodiment of the invention the computer program product further comprises an executable portion configured for receiving from a custodian a location identifier indicating the node location of the data on the shared drive, using the processing device.

In further accord with an embodiment of the invention the computer program product further comprises an executable portion configured for identifying links to other data located outside of and associated with the data, using the processing device.

In accordance with another embodiment of the invention the computer program product further comprises an executable portion configured for sending a follow up inquiry to a custodian presenting the links to the other data to the custodian, using the processing device, wherein the custodian is asked if the other data should be captured.

In yet another embodiment of the invention the computer program product further comprises receiving from a custodian information indicating whether the other data should be captured and transferred to the electronic discovery system, using the processing device.

BRIEF DESCRIPTION OF THE DRAWINGS

Figure 1:
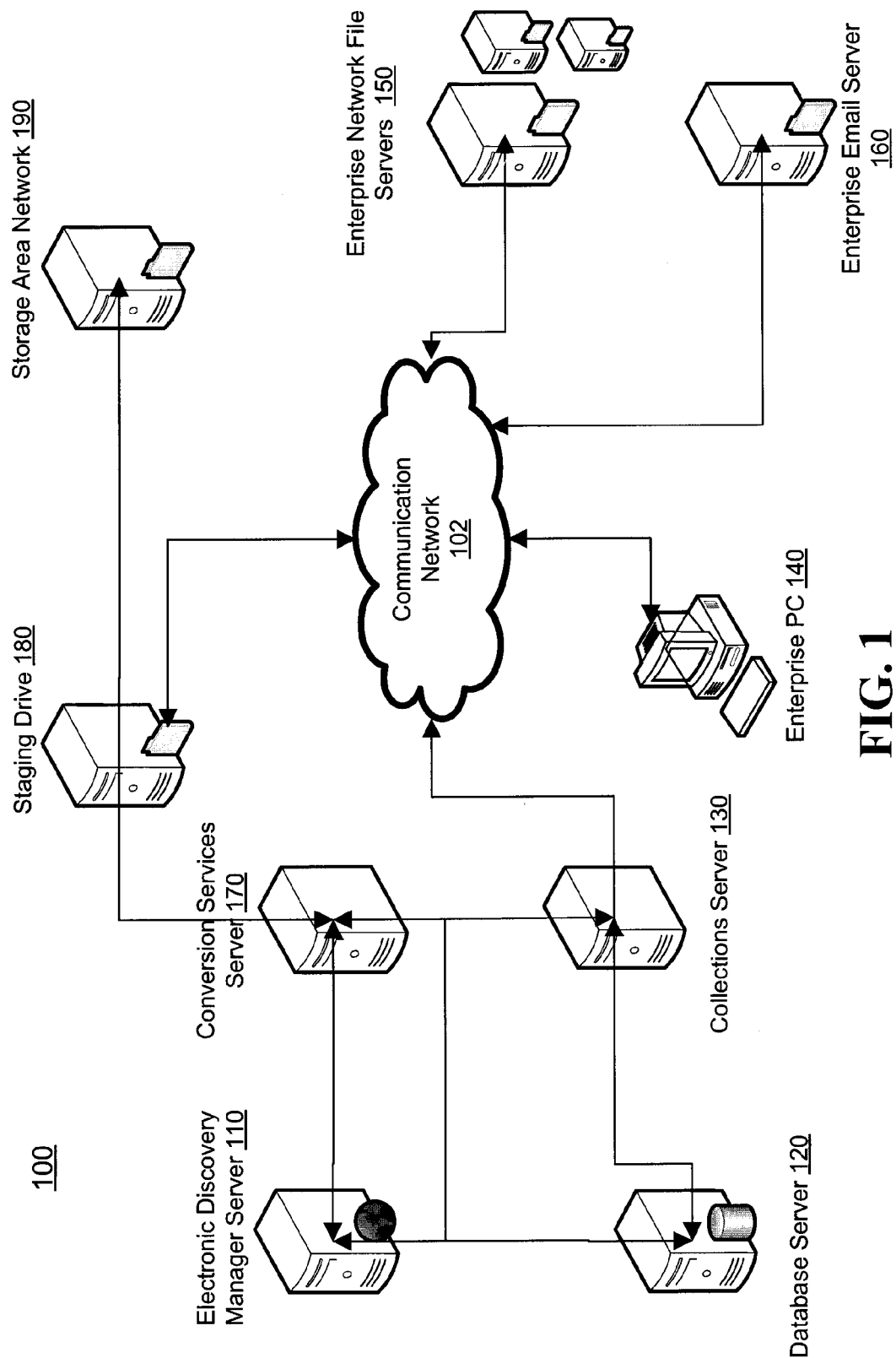
Figure 2:
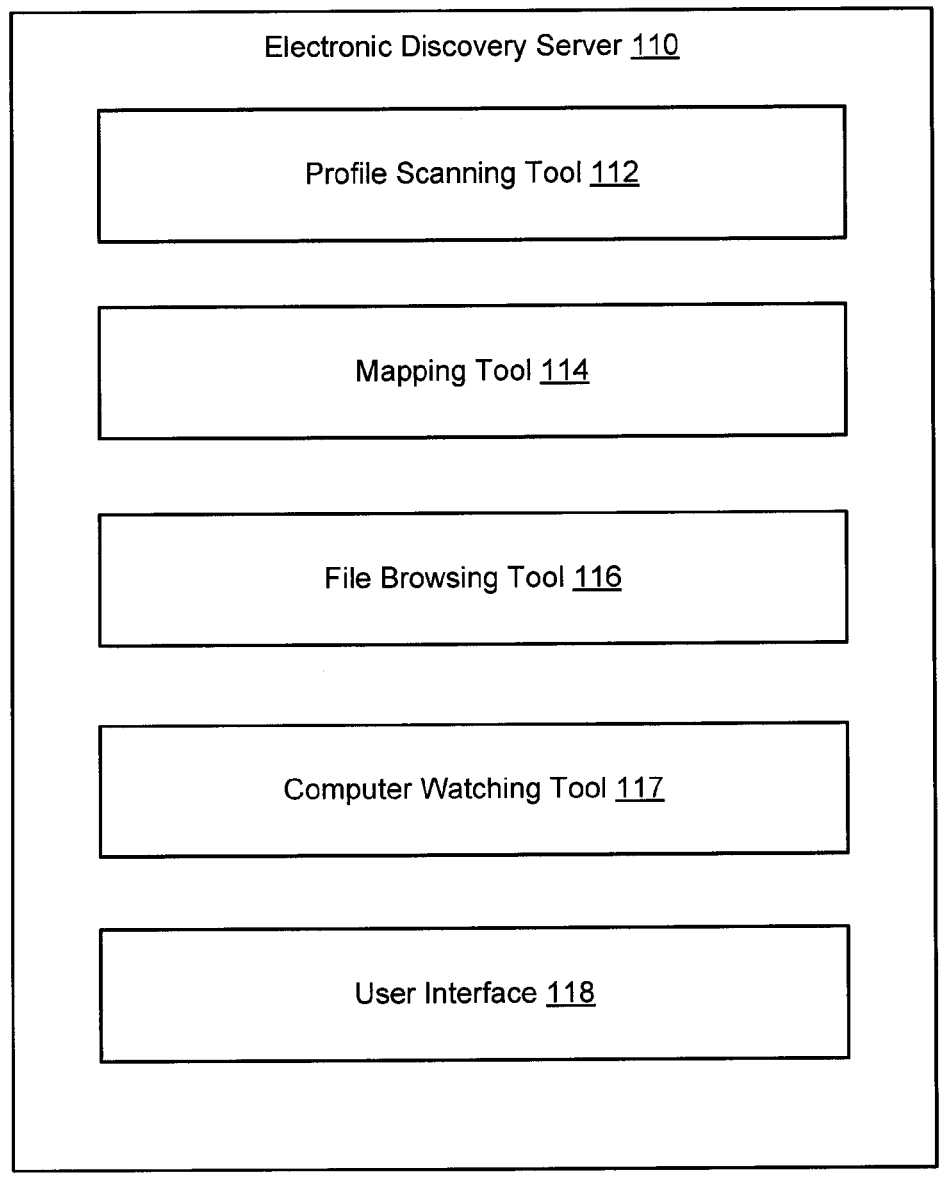
Figure 3:
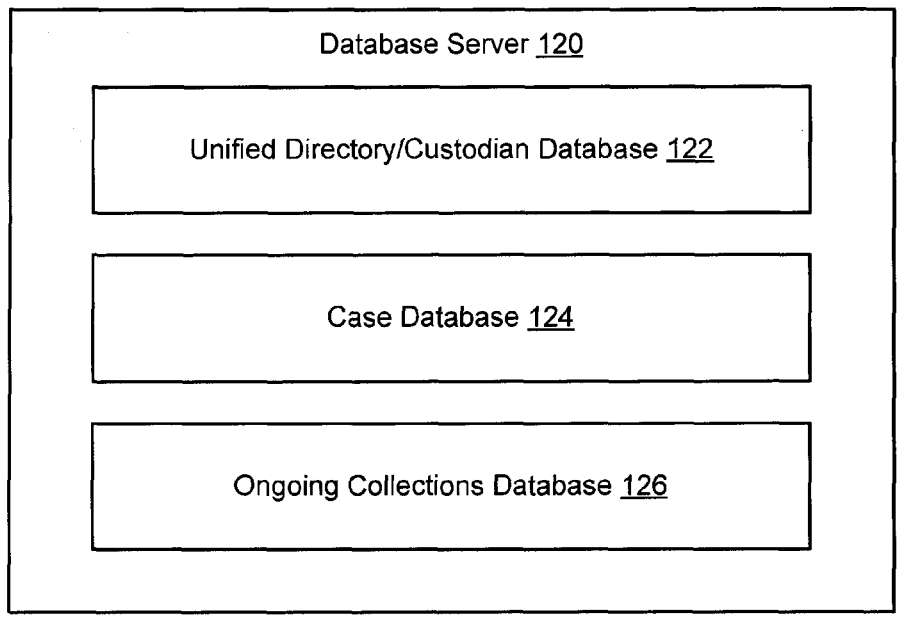
Figure 4:
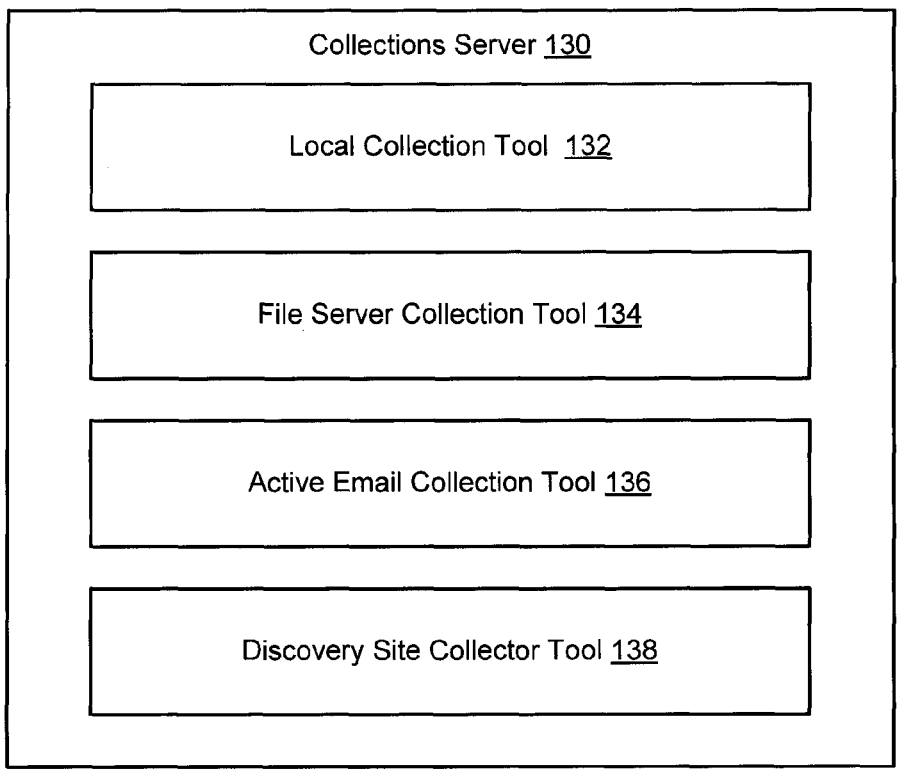
Figure 5:
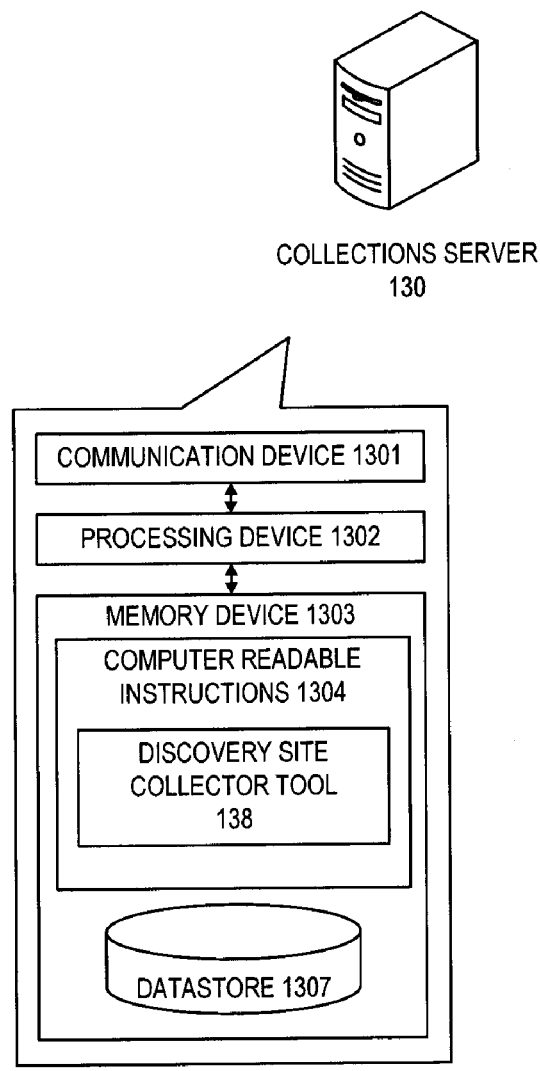
Figure 6:
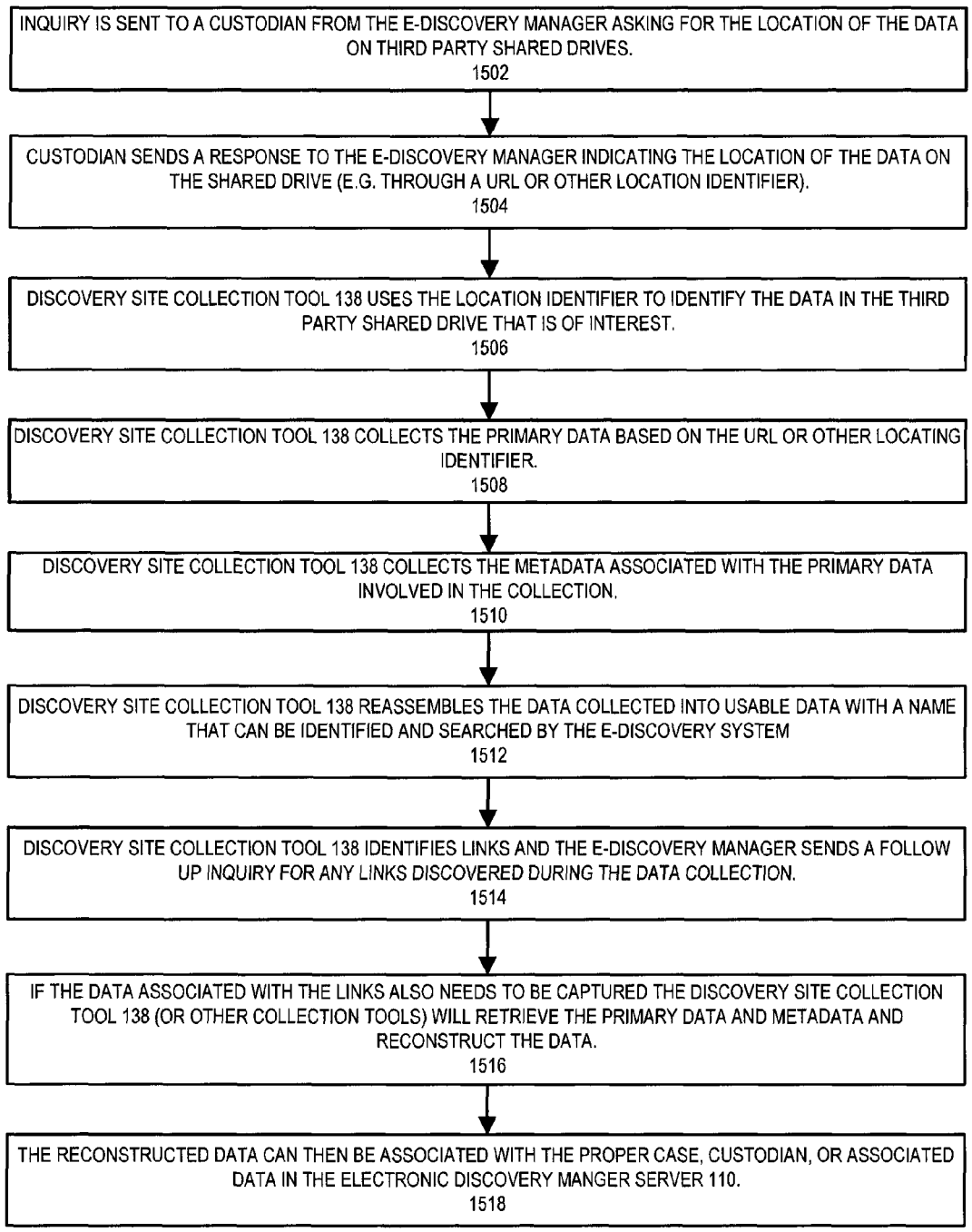
Figure 7:
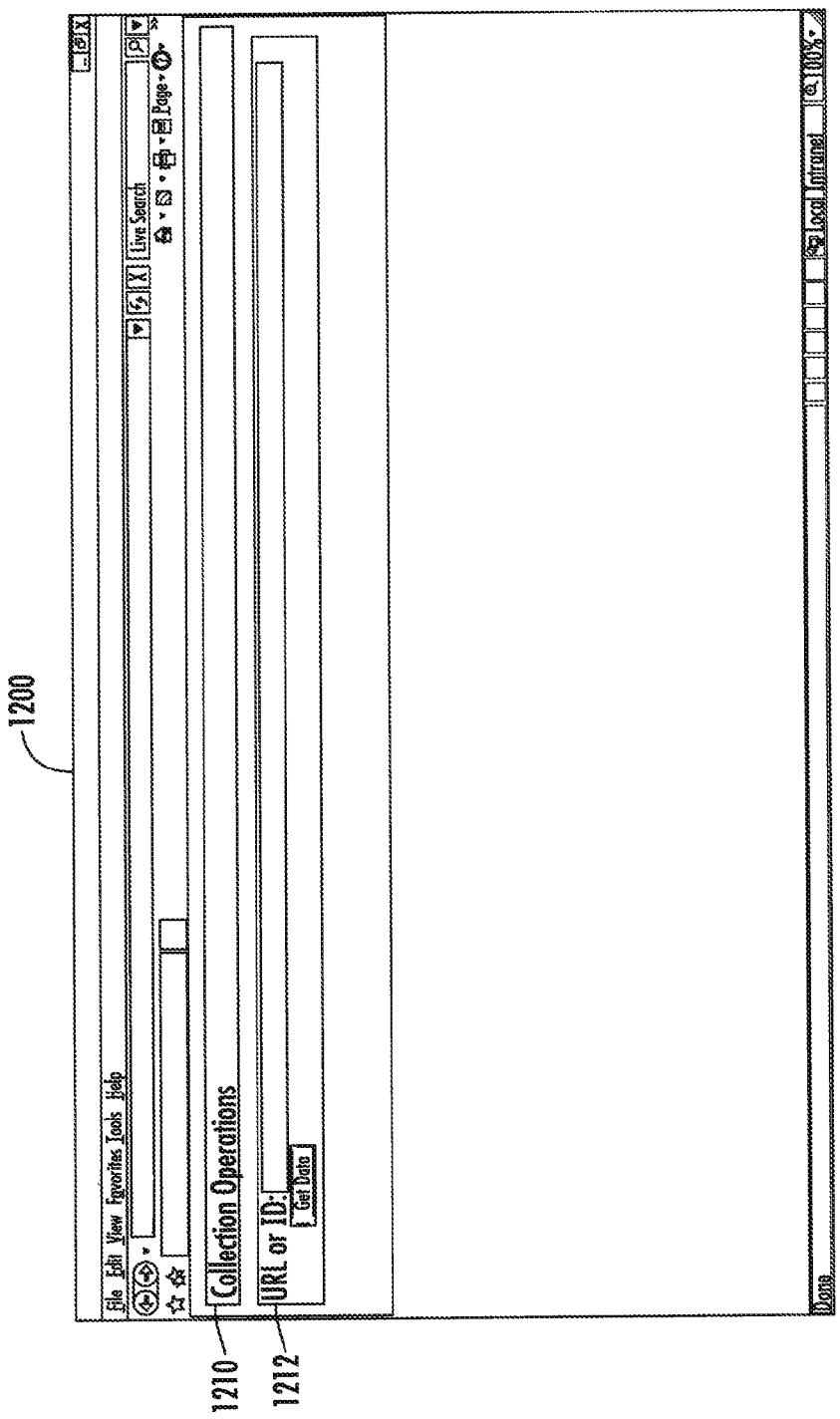
Figure 8:
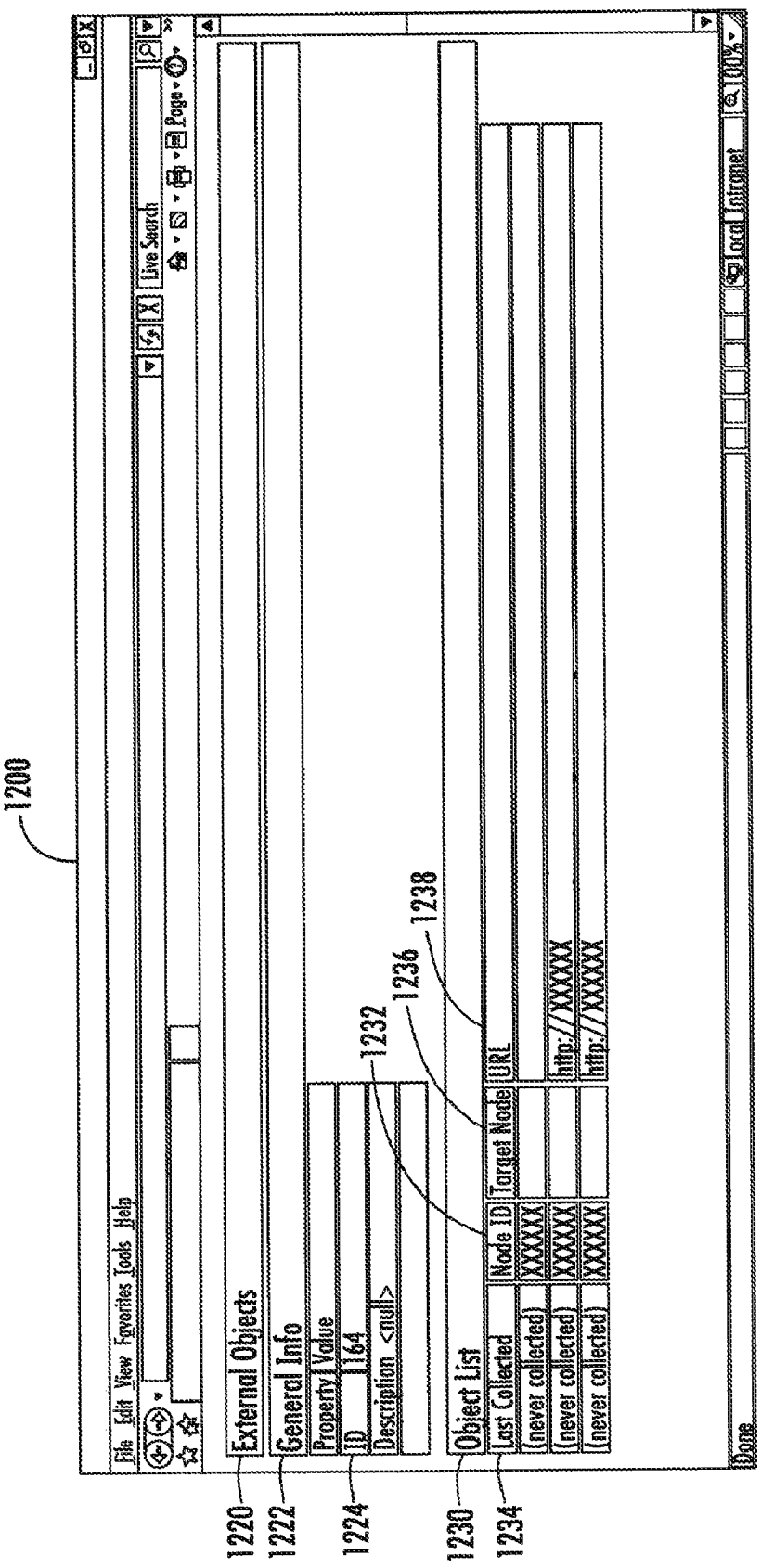
Figure 9:
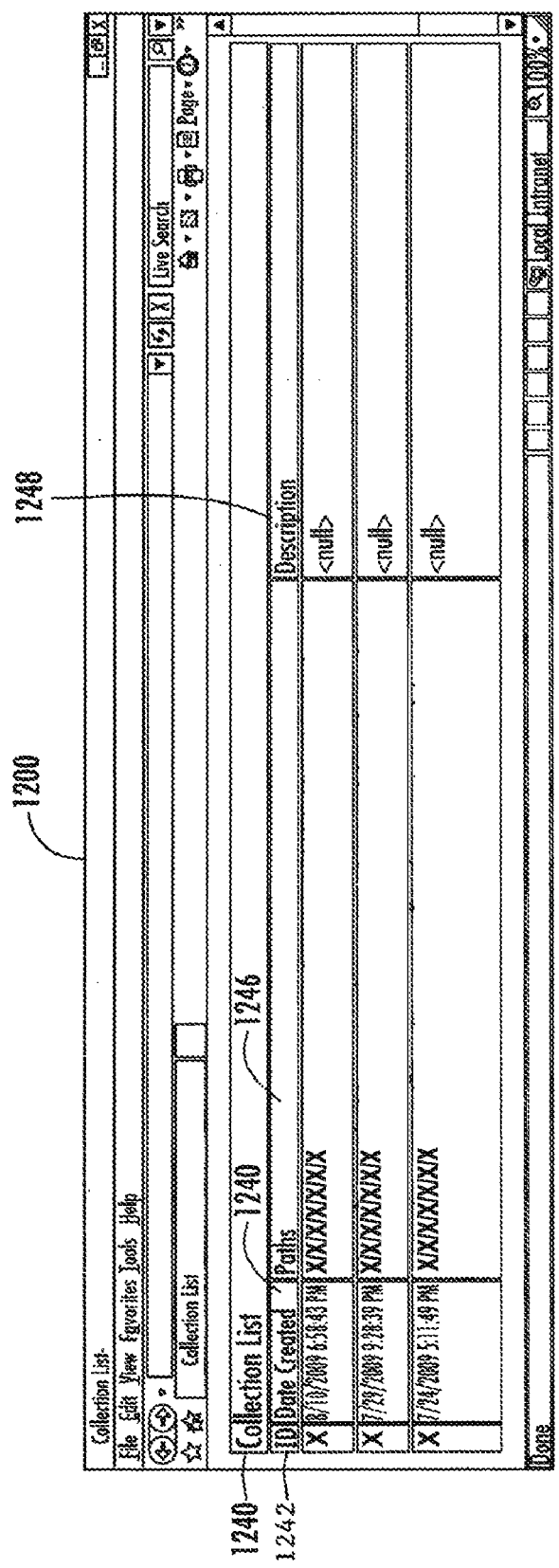
Figure 10:
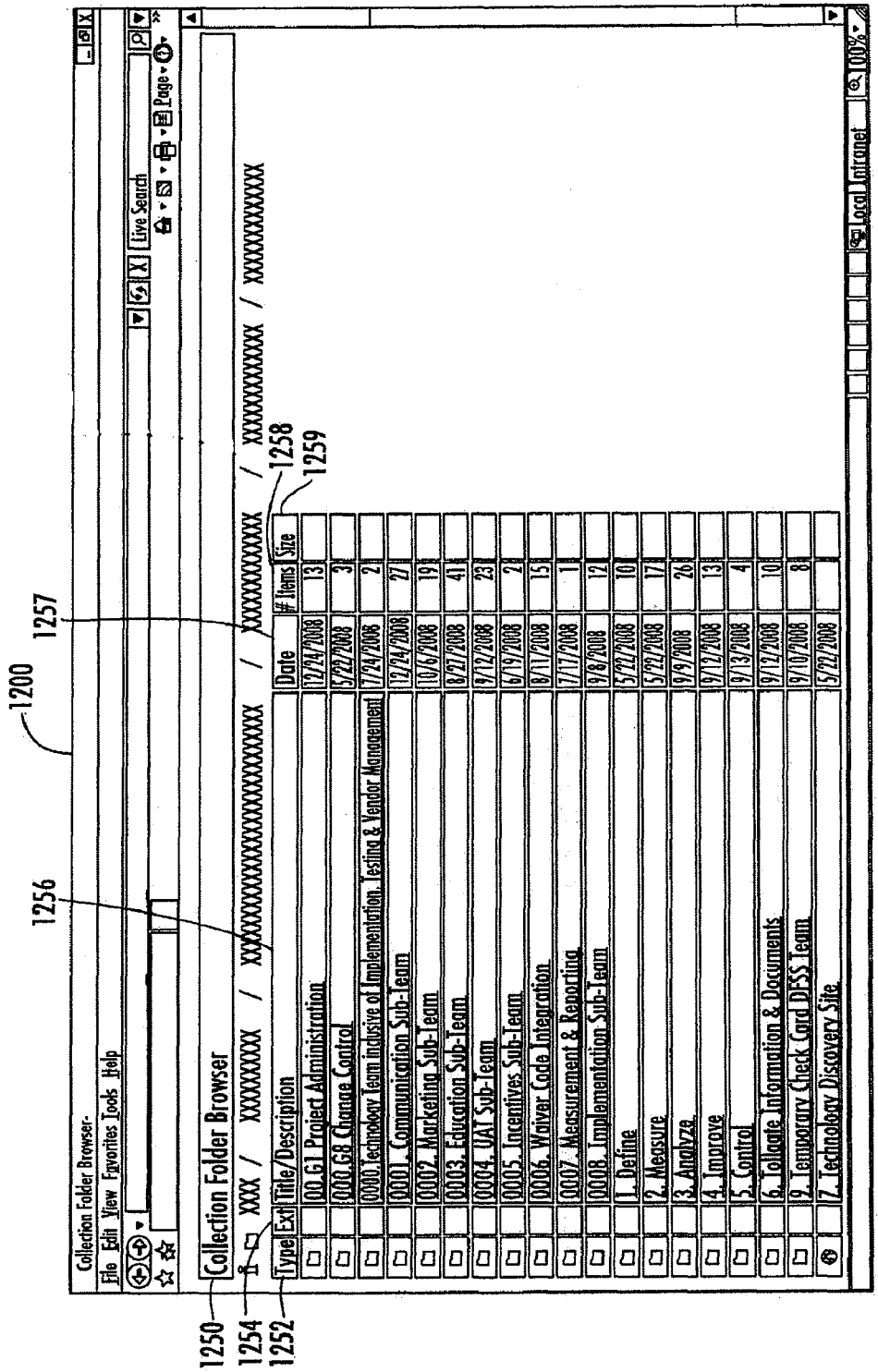

Having thus described embodiments of the invention in general terms, reference may now be made to the accompanying drawings:

FIG. 1 illustrates a network environment in which the processes described herein are implemented, according to one embodiment of the invention;

FIG. 2 is a block diagram of an electronic discovery manager server, in accordance with embodiment of the present invention;

FIG. 3 is a block diagram of a database server, in accordance with an embodiment of the present invention;

FIG. 4 is a block diagram of a collection server, in accordance with an embodiment of the present invention;

FIG. 5 is a system diagram of the components of a collection server, in accordance with an embodiment of the invention;

FIG. 6 is a process map illustrating the process of collecting data from third party shared drives, in accordance with an embodiment of the invention;

FIG. 7 is a Discovery Site Collector Tool input interface for gathering data from a shared drive, in accordance with an embodiment of the invention;

FIG. 8 is a Discovery Site Collector Tool summary interface for illustrating what data will be gathered, in accordance with an embodiment of the invention;

FIG. 9 is a Discovery Site Collector Tool list interface for illustrating various groups of data that has been gathered, in accordance with an embodiment of the invention; and FIG. 10 is a Discovery Site Collector Tool browser interface for identifying what data has been gathered within a group, in accordance with an embodiment of the invention.

Figure 11:
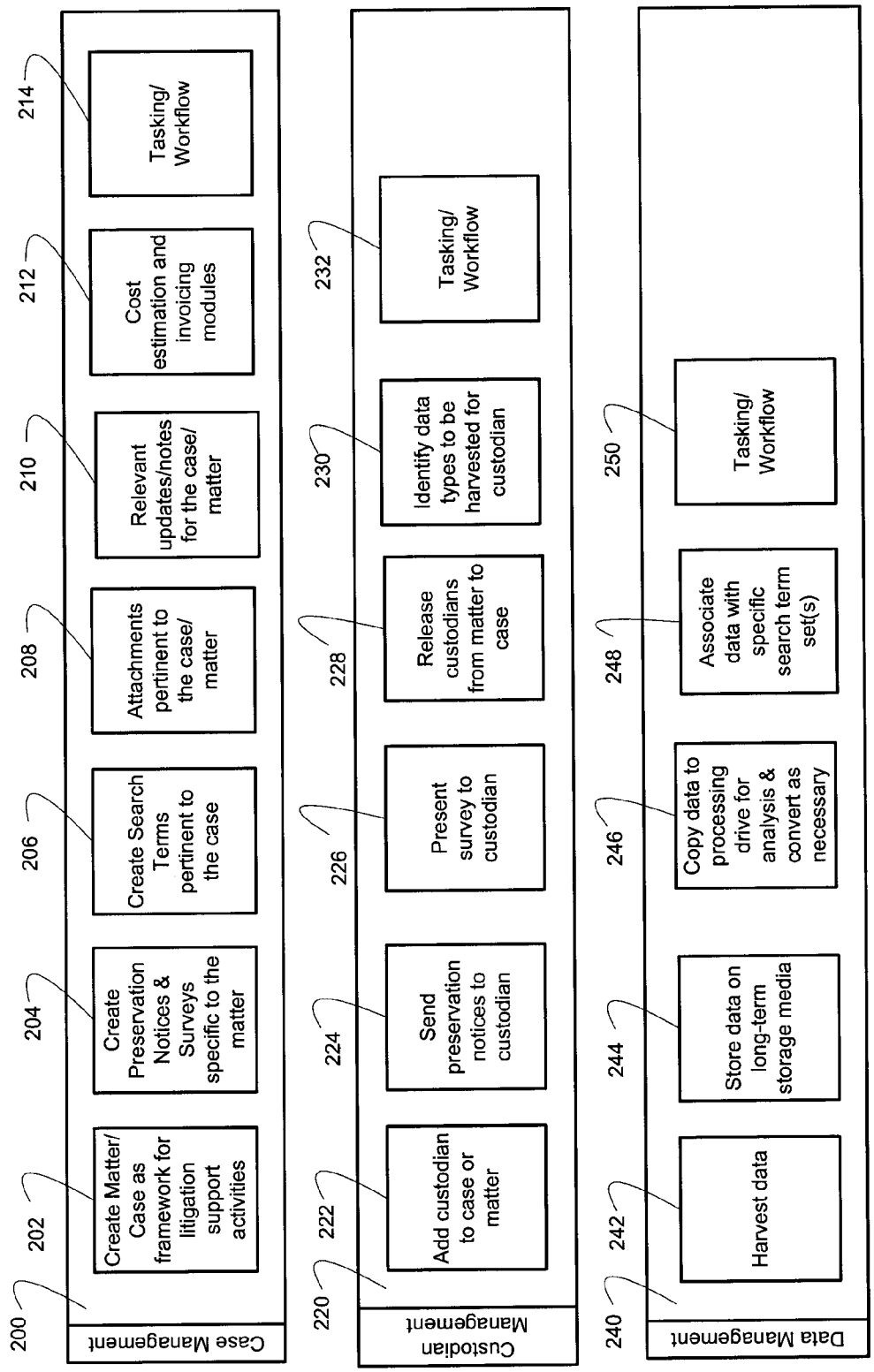
Figure 12:
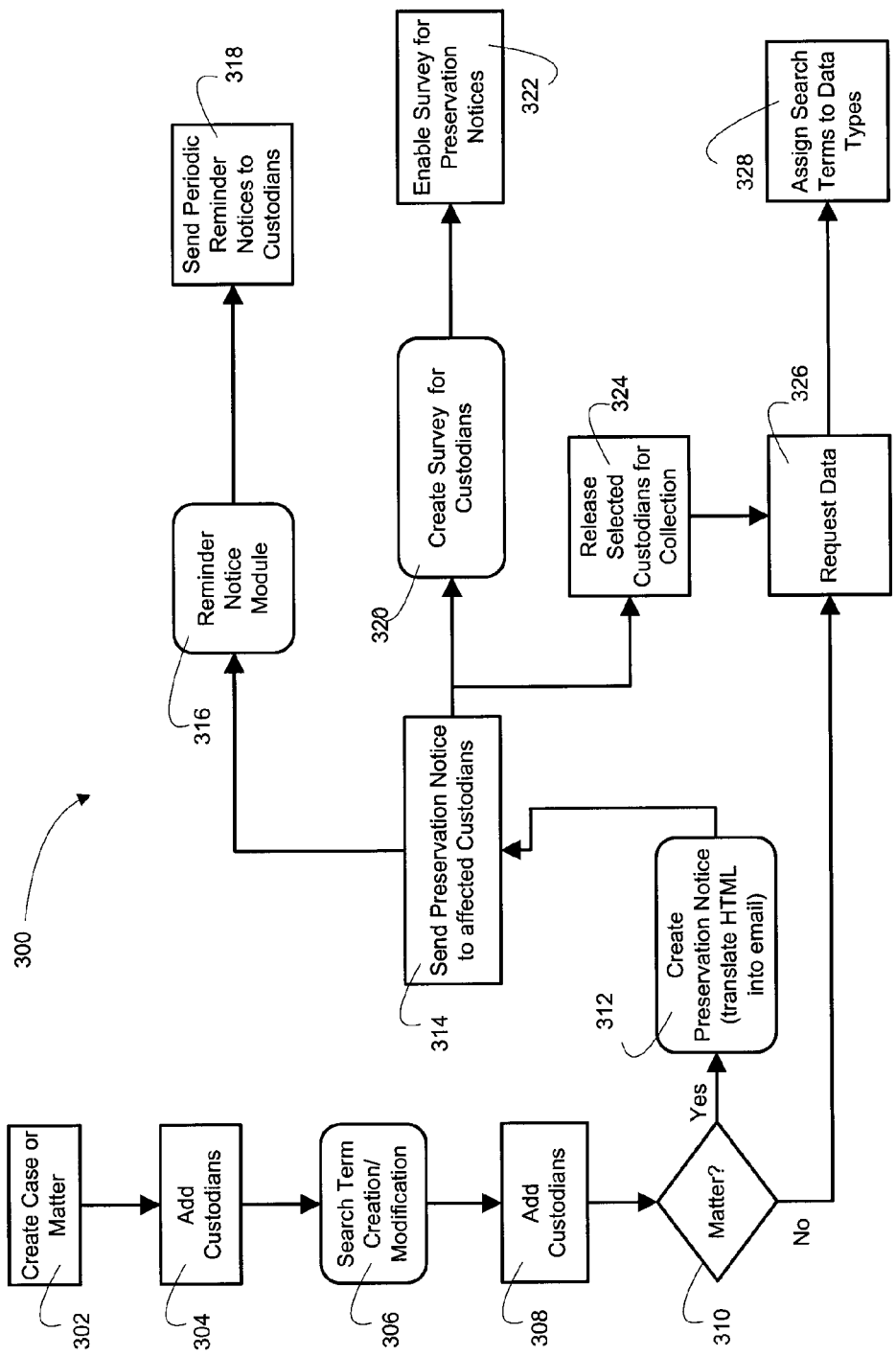
Figure 13:
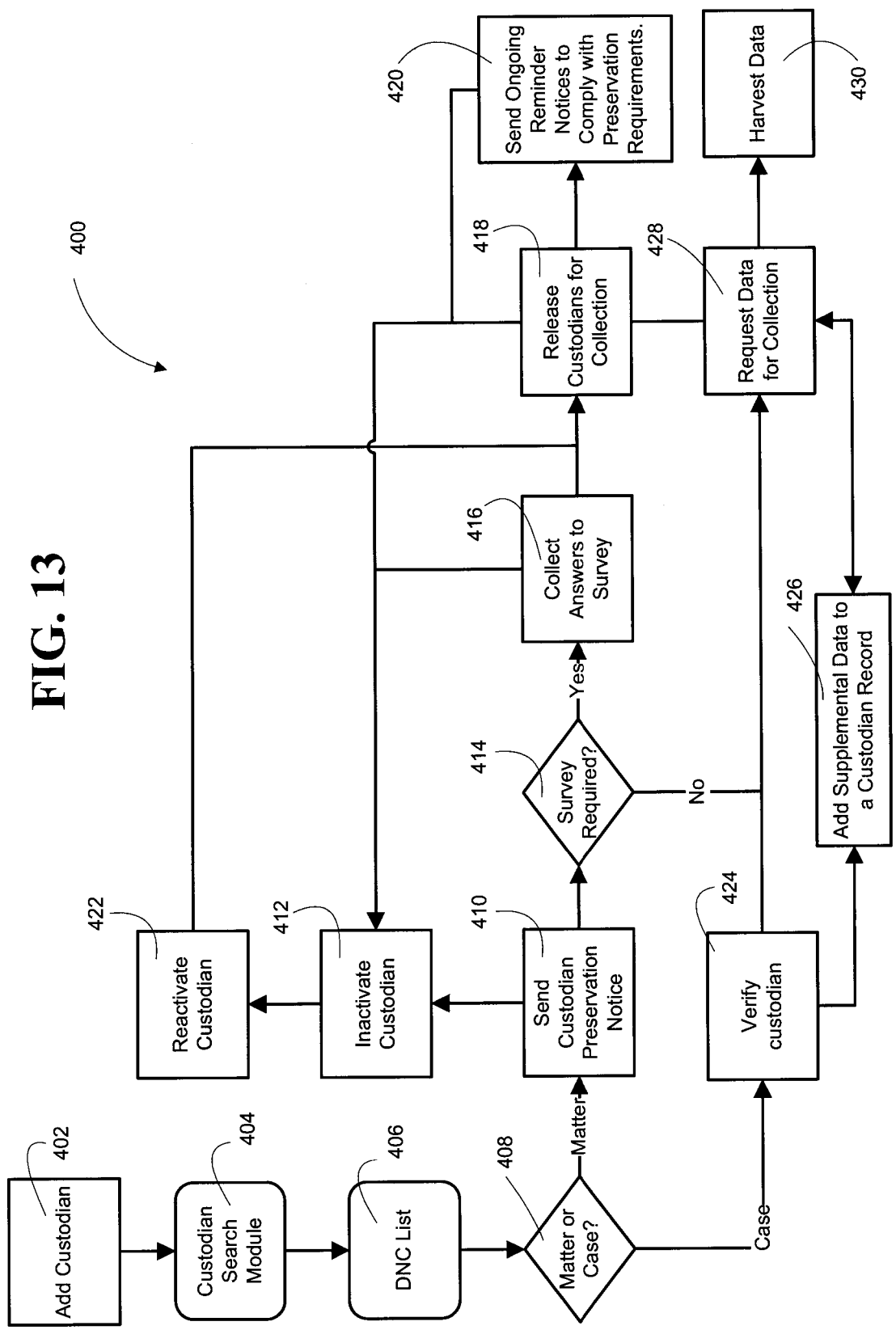
Figure 14:
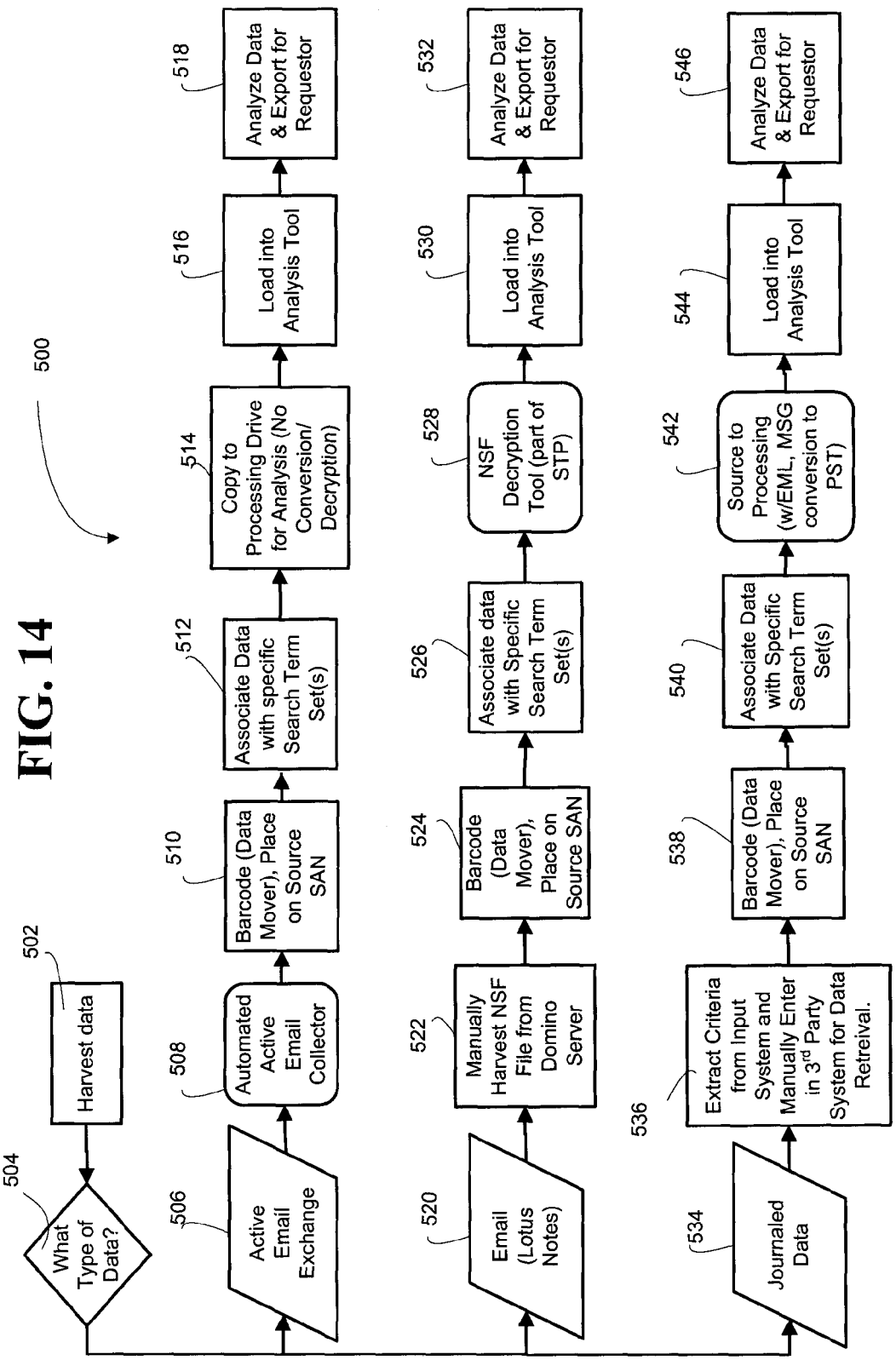
Figure 15:
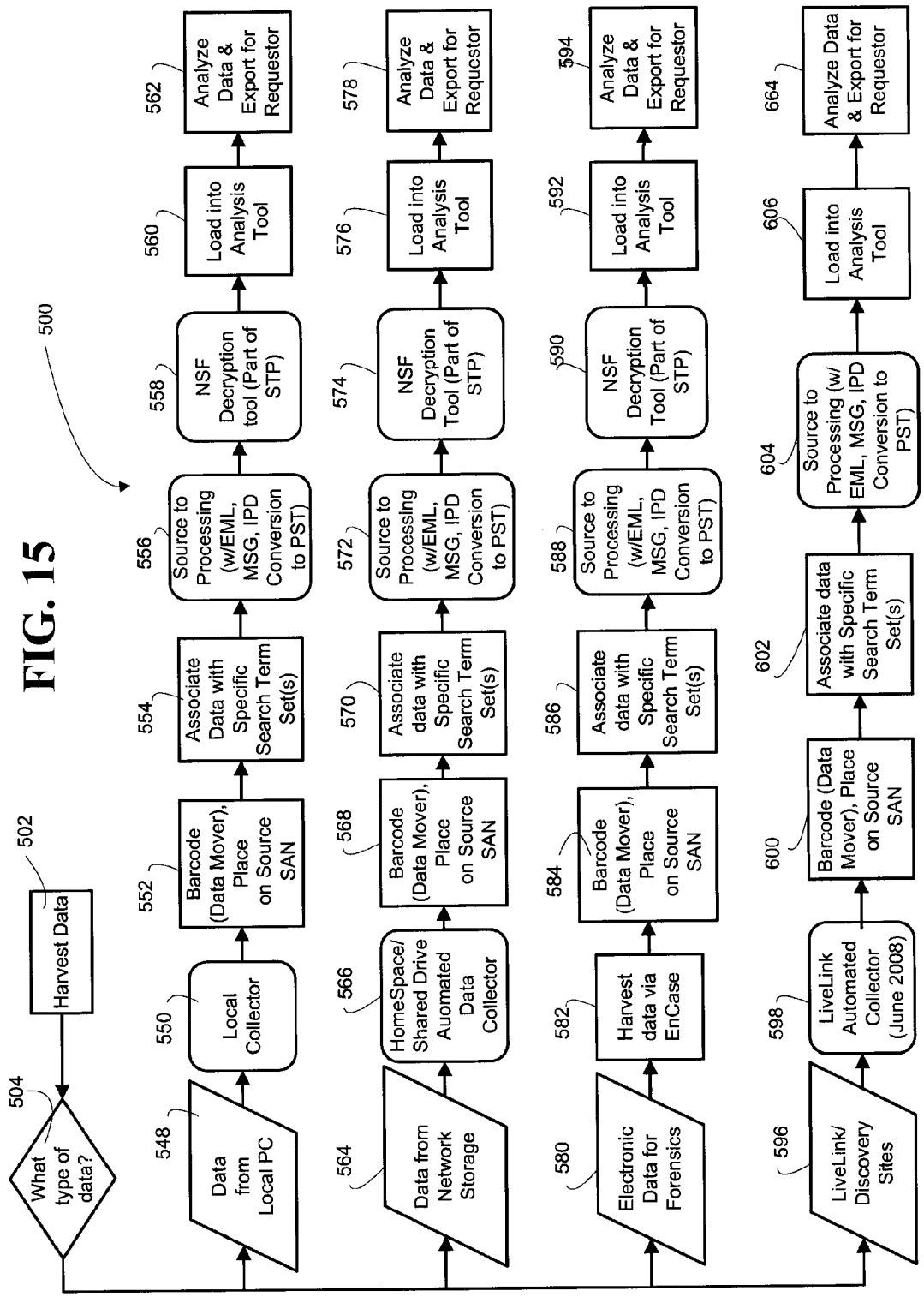

FIG. 11 is block diagram illustrating electronic discovery management structure, in accordance with an embodiment of the invention;

FIG. 12 is a flow diagram of a method for initiating a case or matter including creating search terms, creating and sending preservation notices, sending reminder notices and creating and sending surveys to custodians, in accordance with embodiments of the present invention;

FIG. 13 is a flow diagram of a method for custodian management in an electronic discovery system, in accordance with an embodiment of the present invention;

FIGS. 14 and 15 are flow diagrams of methods for harvesting different data types in an electronic discovery system; in accordance with an embodiment of the present invention;

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As may be appreciated by one of skill in the art, the present invention may be embodied as a method, system, computer program product, or a combination of the foregoing. Accordingly, the present invention may take the form of an entirely software embodiment (including firmware, resident software, micro-code, etc.) or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, infrared, or semiconductor system, apparatus, device, or propagation medium. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

FIG. 1 illustrates an exemplary electronic discovery system 100 in accordance with an embodiment of the invention. In some embodiments, the environment of the electronic discovery system 100 is the information technology platform of an enterprise, for example a national or multi-national corporation, and includes a multitude of servers, machines, and network storage devices in communication with one another over a communication network. In particular, an electronic discovery management server 110, at least one database server 120, a collections server 130, enterprise personal computers 140, enterprise file servers 150, including at least one personal network storage area and at least one shared network storage area, enterprise email servers 160, a conversion services server 170, a short-term staging drive 180, and a long-term network storage network 190 are all in communication over a communication network 102. The communication network 102 may be a wide area network, including the Internet, a local area network or intranet, a wireless network, or the like.

As shown in the block diagram of FIG. 2, the electronic discovery management server 110 provides user interface management via a user interface 118. In some embodiments, the electronic discovery management server 110 is a web server that is accessed via a web browser. In one particular embodiment, the electronic discovery management server 110 is an intranet website server that may be accessed utilizing a web browser on a machine within the enterprise. Through the electronic discovery management server 110, the user interface 118 may be presented to a user for the purposes of managing the electronic discovery process and all processes described herein that are inherent thereto. For illustrative purposes, it may be assumed herein that the primary user interacting with the user interface 118 is an employee or contractor of the company who serves an electronic discovery management role, and hereafter is referred to as the "e-discovery manager." As discussed in greater detail below, the e-discovery manager may utilize the user interface 118 to manage cases, custodians, collections, and collected data. It should be appreciated, however, that any individual could use the user interface 118 to perform the manual functions herein attributed to the e-discovery manager, and, indeed, that an automated process could perform those functions as well.

Referring again to FIG. 1, the electronic discovery management server 110 is in communication with the database server 120 and the collections server 130 via the communication network 102. The database server 120, as shown in the block diagram of FIG. 3, is configured to provide database services for the electronic discovery management server 110, including housing the Unified Directory/custodian database 122, which includes data relating to individual custodians, the case database 124, which includes data relating to particular cases, and ongoing collections database 126, which includes data relating to collections being undertaken by the collections server 130. Each of the foregoing databases within the database server 120 is discussed in detail below. It should be understood that multiple database servers could be employed instead of a single database server, and reference to a single database server is for illustrative and convenience purposes only. For example, the Unified Directory 122 could be stored in one database server and the ongoing collections data 126 could be stored in another database server.

Regardless of the number of database servers employed, it is an object of embodiments of the present invention that data relating to custodians and cases be stored in the database server 120 independently. While custodian data in the Unified Directory 122 and case data in the case database 124 may be linked or correlated within the database server 120, for example, when custodians are assigned to particular cases, custodians may be managed separately from cases. Therefore, when a case is initialized and a custodian is assigned to the case, information for that custodian (such as data storage locations for that custodian) is accessed by the electronic discovery management server 110 in the Unified Directory 122 in the database server 120 and linked to the particular case, rather than manually input by the e-discovery manager into the case.

Furthermore, in addition to separating (but allowing linkage of) custodian management and case management processes, and as discussed further below, data management processes relating to the collection of data from custodian storage locations during electronic discovery are also separated from case management and custodian management processes. In this regard, the data collected from a particular custodian is stored separately from both the custodian information and any relevant case information (as discussed below, it is stored in long-term network storage network 190), but is linked to a custodian, which is in turn linked to one or more cases. This is advantageous because in the event a particular custodian is assigned to multiple cases, data collected from the custodian may be shared with the other case(s) to which the custodian is assigned. Therefore, the various processes and components of the electronic discovery system 100 may be categorized within one of case management, custodian management, or data management. And even though cases, custodians, and collected data may all be managed separately, there are necessarily links between the various datastores to allow management of the overall electronic discovery process.

The electronic discovery system 100 collects data from various data sources. In accordance with embodiments of the present invention, data is collected from multiple channels using various collection tools. During the collection, the type of data is first identified and the proper tool is selected to collect the data. The data collection tools, in one embodiment of the invention, are stored on a collections server, as illustrated in FIG. 4. In one embodiment of the invention the collections server 130 includes, among other collection tools, a discovery site collector tool 138. One type of data collected is collaborative data, such as data residing at discovery sites that allow for file sharing, for example LiveLink® or the like. For data located on discovery sites, the discovery site collector tool 138 is used to collect the data.

As illustrated in FIG. 5, the collections server 130 generally includes a communication device 1301, a processing device 1302, and a memory device 1303. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 1302 is operatively coupled to the communication device 1301, and the memory device 1303. The processing device 1302 uses the communication device 1301 to communicate with the network 102, and other devices on the network 102, including but not limited to the electronic discovery manager server 110, database server 120, enterprise PC 140, enterprise network file servers 150, enterprise e-mail server 160, conversion services server 170, and the staging drive 180, all of which have the same or similar components as the collections server 130. As such, the communication device 1301 generally comprises a modem, server, or other device(s) for communicating with other devices on the network 102. As further illustrated in FIG. 5, the collections server 130 contains computer-readable program instructions 1304 stored in the memory device 1303, which includes the computer-readable instructions 1304 of a discovery site collector tool 138. In some embodiments the memory device 1303 includes a datastore 1307 for storing data related to the collections server 130, including but not limited to data created or used by the discovery site collector tool 138. Although FIGS. 1 and 5 illustrate the collections server 130 as one system, it is important to note that there can be one or multiple systems with one or multiple collector tools, or the collection server 130 can be incorporated with other systems or servers.

As will be discussed in further detail below, the discovery site collector tool 138 is configured to access third party shared drives, such as LiveLink®, SharePoint, or other file sharing data storage programs. Third party shared drives are places where various users may share files by downloading and saving files to the shared drive storage locations. According to one embodiment of the invention, generally, the discovery site collector tool 138 preserves at least a portion of the data on the third party shared drive and stores it in the e-discovery system 100.

In one embodiment, a location (i.e. node location) of files is identified by the e-discovery system 100. The e-discovery manager or other users can manually or in other embodiments automatically receive the node location of folders and files on third party shared drives. For example, the e-discovery manager can receive the node location manually through surveys or automatically from information stored in the Unified Directory 122, which are both discussed in further detail later.

After the discovery site collector tool 138 receives the location identifier that indicates the node location of folders and files in a shared drive, it automatically identifies the data located at that node, as well as any data located in the hierarchal levels below that node. In some embodiments the data includes all revisions of the files identified. The discovery site collector tool 138 is configured to access the third party shared drive, copy the identified data in the shared drive, and transmit the copied data to the collections server 130 or other server in the electronic discovery system 100. In some embodiments the discovery site collector tool 138 will compress, hash, and/or upload the files to the collections server 130. In other embodiments of the invention the files are transferred to other severs for data collection, staging, and/or storage, such as the staging drive 180, database server 120, electronic discovery manger server 110, etc. In this regard, the discovery site collector tool 138 queries against the database to define what files need to be retrieved then copies those files based on the result of the query.

The discovery site collector tool 138, in some embodiments, is programmed to automatically find and copy files that meet certain criteria, in order to identify the proper files and reduce the amount of files and duration of the file transfer. The criteria, for example, include size restrictions which limit the size of files that can be collected. In some embodiments, the discovery site collector tool 138 generates a size estimate of the files targeted for copying and prompts the e-discovery manager before the collection is actually made. In other embodiments, the discovery site collector tool 138 may automatically begin the collection process (copying and transmitting data) if the size estimate falls below a predetermined threshold.

Additionally, in some embodiments, the discovery site collector tool 138 is configured to determine whether the folders and files being collected from a third party shared drive includes links to other folders or files that should be captured for e-discovery purposes. If the discovery site collector tool 138 identifies links to other folders or files it creates a notification to inform the custodian that other associated files may exist. Thereafter the custodian can confirm or deny that the e-discovery manager should collect the associated folders and files.

In some embodiments of the invention the data being collected is not in a useable form. Therefore, in some embodiments, metadata associated with the captured folders and files is located and retained in case management system tables. The discovery site collector tool 138 uses the metadata to reconstruct the captured data into files that are useable in the electronic discovery system 100. For example, in some embodiments the discovery site collector tool 138 collects the files and the related metadata, and then uses the metadata to automatically rename the files into a format that is searchable by the electronic discovery system 100.

Metadata (also known as meta-information) is generally described as data about other data. Metadata in some embodiments is used in any type of media to describe any individual or content item, or a collection of data, including but not limited to multiple content items and hierarchical data levels. Metadata in some embodiments is utilized in data processing and data mining, by providing information about or documentation of primary data managed within an application or database. The metadata typically includes information that defines how the primary data is structured or stored in the database. More specifically, in some embodiments the metadata captures elements or attributes of the primary data, such as the name, size, data type, etc. of the primary data. The metadata in some embodiments also captures how the primary data is stored, such as the length, fields, columns, where it is located, association with other data, ownership of the data, etc. The metadata in some embodiments includes numbers, letters, symbols, or a combination of the three that is specific to the database the primary data is stored within or specific to applications that use the primary data. In other embodiments the metadata includes descriptive information about the context, quality, condition, or characteristics of the primary data, such as the title of a document (which can be classified as both primary data and metadata).

One embodiment of collecting data from discovery sites is described in further detail in FIG. 6, which outlines the discovery site collection process 1500 illustrating how the discovery site collector tool 138 works to retrieve folders and files from third party shared drives. Furthermore, FIGS. 7-10 illustrate various screens of a discovery site collection tool interface 1200, in accordance with one embodiment of the invention.

As illustrated in FIG. 6, the first step in one embodiment of the discovery site collection process 1500 is that an inquiry is sent either manually or automatically to custodians by an e-discovery manager or other user asking for the location of folders and files related to a particular case, as illustrated by block 1502. As discussed in more detail below, the inquiry, in some embodiments, is in the form of a preservation notice and/or survey that is sent to the custodians involved in a case automatically, when a custodian is added to a case or the e-discovery manger releases the custodian in a matter to the underlying case. In some embodiments, the inquiry is made manually by sending an e-mail or other form of communication to a custodian inquiring as to the location of folders and files on third party shared drives. In other embodiments of the invention, the inquiry is not necessary because the location of folders and files is already stored in the Unified Directory 122 or other database by the custodian, or because the location was captured for other custodians or cases.

As illustrated by block 1504, in one embodiment, the custodian answers the inquiry by sending a response to the e-discovery manager or system, disclosing the location of the folders and files of interest on the third party shared drives. In one embodiment of the invention the response includes a URL or other location identifier, such as an ID or location node assigned to the location, to identify the proper folders and files. In one embodiment of the invention, the discovery site collector tool interface 1200 has a URL or ID identifier 1212 field in the Collection Operations zone 1210, as illustrated in FIG. 7. The URL or ID identifier 1212 field is either automatically populated by the e-discovery system or manually populated by the e-discovery manger. In other embodiments the URL or ID identifier field 1212 is another location identifier that discloses the location of the folders and files of interest.

As illustrated by block 1506 in FIG. 6 the discovery site collector tool 138 then automatically identifies all the subfolders and files that are located in the hierarchy at and below the URL identified and summarizes the results in the General Info 1222 section of the External Object zone 1220, as illustrated in FIG. 8. The summary results include, in some embodiments, the assigned ID 1224, as well as the Object List 1230. The Object List 1230, in some embodiments, lists the Node ID 1232, when the data was Last Collected 1234, the Target Node 1236, and the URL location 1238. In one embodiment the Node ID 1232 uniquely identifies an object, for example in the case of an external objects report it is the node representing the hyperlink or alias that points to another resource. In one embodiment the Target Node 1236 is the target node for a hyperlink or alias. If the object is an alias, then this values is already stored in the database, otherwise it is parsed out of the URL text if the text matches a particular pattern.

In some embodiments the discovery site collector tool 138 shows the hierarchical path, thus providing the user a visual tree diagram of the location of the folders and files that are set to be captured. This gives the e-discovery managers a check to make sure the proper files are identified. In some embodiments, the discovery site collector tool 138 determines and displays the size of the folders and files set to be retrieved for the electronic management server 110 before the e-discovery manager can retrieve them. Therefore, files are only retrieved if they meet the specified size and other criteria requirements. This check prevents the discovery site collector tool 138 from accidently trying to transfer all of the folders and files in the third party shared drive to the electronic discovery system 100. In some embodiments, other criteria besides the size of the folders and files are established to regulate the folders and files set to be retrieved.

As illustrated by block 1508, if the folders and files identified meet the established criteria, the discovery site collection tool 138 collects the folders and files identified by the URL or other locator, zips them up, and transfers them to the appropriate server. However, since the folders and files are located on third party shared drives, often the associated folder and file names and hierarchical structures are not controlled under the same systems and rules as the enterprise using the electronic discovery system 100. Thus the folders and files as they are stored in the third party shared drives are not useable files. Therefore, the discovery site collector tool 138 also captures metadata associated with each folder and file collected, as illustrated by block 1510. The metadata is used by the discovery site collector tool 138 to reconstruct and rename the folders and files into useable hierarchical schemes and information that is compatible with and used by the enterprise running the electronic discovery system 100, as illustrated by block 1512.

As illustrated by block 1514, if there are links in folders and files to other locations within the third party shared drive or on other server locations the discovery site collector tool 138 identifies and captures those links while collecting the folders and files identified by the URL or other locator. The electronic discovery system 100 will allow the e-discovery manager to either manually or automatically send a follow up inquiry to the custodian to determine if the additional folders and files associated with the identified links should be captured. If the custodian responds that the folders and files associated with the link should be captured the discovery site collector tool 138, will copy the linked data from the third party shared drive, as illustrated by block 1516. In some embodiments of the invention other collection tools are used to capture the linked data, for example when the links in the shared drive are to folders and files located on other servers. In some embodiments the discovery site collector tool 138 proceeds with copying the folders and files associated with the link automatically if the folders and files meet the proper criteria (e.g. the proper size requirements, etc.) without sending additional inquires to the custodians.

As illustrated by block 1518 the folders and files captured from the third party shared drives (as well as any associated files from a link) are transferred to the proper servers and are associated with the proper custodian, case, and data, for the electronic discovery system 100 as described in further detail below.

The discovery site collection tool interface 1200, also allows the e-discovery manager to maintain, manage, and view the folders and files downloaded from third party shared drives using the discovery site collection tool 138. As illustrated in FIG. 9, the e-discovery manger can view a list of all the collections run for the third party shared drives in the Collections List 1240 of the discovery site collection tool interface 1200. The Collections List 1240 will list the collection ID 1242, the date created 1244, the path 1246, and the description 1248 of the captured data, as illustrated in FIG. 9. Furthermore, the e-discovery manger or other user may view the folders and files collected by selecting one of the collection IDs 1242 in FIG. 9. After making the selection, the folders and files are displayed in the Collection Folder Browser 1250, as illustrated in FIG. 10. The Collection Folder Browser 1250, includes the type 1252 of data collected (folder, file, link, etc.), the Ext 1254 (file extension), the Title and Description 1256 of the data collected, the date 1257 the data was collected, the number of Items 1258 in the folder, and the Size 1259 of the items captured.

Custodian

With regard to custodian management, according to some embodiments of the present invention, the Unified Directory/custodian database 122 houses information relating to all potential custodians within the enterprise and the locations where those custodians store data. The information stored in the Unified Directory 122 may include for a particular custodian, for example, the custodian's name, position, human resources identifier (a unique number for each employee of the enterprise), employment location, domain, email addresses, network user identification, personal computer(s) name, paths of network storage devices used by the custodian, including Shared Drives and HomeSpaces, work history, related persons (such as managers, team members or subordinates), and any other information that may be relevant to the discovery process. Since the human resources identifier is always unique for each custodian, in some embodiments, the Unified Directory 122 may be organized around the human resources identifier. All of the information relating to how the Unified Directory 122 is generated is a multi-step process that utilizes multiple tools and methods of identifying relevant information.

For example, the electronic discovery management server 110 or the database server 120 may interface with the computer databases of the human resources computer systems of the enterprise to copy the information from the human resources databases into the Unified Directory 122. In some embodiments, the electronic discovery management server 110 may also reach out to a network directory, such as Windows Active Directory, to identify network resources related to particular custodians and integrate this information into the custodian entries including the copied human resources information. Information for the Unified Directory 122 may also be obtained from the managers of the information technology network, i.e., those individuals responsible for setting up email accounts for custodians and managing the various file servers of the enterprise. Furthermore, in addition to retrieving information in the manners described above, in some embodiments, information in the Unified Directory 122 is generated through tools initialized and/or deployed by the electronic discovery management server 110. In particular, in some embodiments, as shown in FIG. 1, a profile scanning tool 112, and a mapping tool 114 are provided.

The profile scanning tool 112 may be deployed by the electronic discovery management server 110 and is configured to crawl the communication network 102, scan each of the enterprise personal computers 140, and transmit to the database server 120 identifying information about each computer, such as computer name and IP address, and a list of all profiles, including demographics information, (or network user identification) associated with each computer. According to different embodiments, the profile scanning tool 112 may be run on the electronic discovery management server 110, the collection server 130, or another server in the communication network 102. In some embodiments, the profile scanning tool 112 is further configured to identify and transmit to the database server 120 the most recent date and time at which a particular profile was logged on to the machine. When information relating to a particular computer is received by the database server 120, the database server 120 uses the profile information, which may include several user identifications, to link the particular computer to the custodians in the Unified Directory 122 associated with those user identifications. The database server 120 may also record in each custodian's entry in the Unified Directory 122 the last time the computer was accessed by the custodian, according to the profile information transmitted by the profile scanning tool 112. Thus, the profile scanning tool 112 ultimately generates a list of personal computers used by each custodian, and this list may be presented to the e-discovery manager when a collection of a custodian's local machine(s) is initialized, as discussed in detail below.

In accordance with some embodiments of the invention, the mapping tool 114 is configured to crawl the communication network 102 and examine the enterprise file servers 150 residing on the communication network 102 to locate and identify the path of any personal network storage area on each server. As used herein, a personal network storage area is a network storage area associated with a single user who reads data from or writes data to it. Personal network storage areas may be in the form of network storage devices or folders or other resources within a network storage device and may be referred to hereafter for clarity purposes as "HomeSpaces." According to different embodiments, the mapping tool 114 may be run on the electronic discovery management server 110, the collection server 130, or another server in the communication network 102. In some embodiments, the mapping tool 114 is a Windows service that is scheduled to execute through use of Windows Scheduled Task. As the mapping tool 114 crawls the communication network 102, it is configured to examine each file server and transmit to the database server 120 the path of any network storage area within the plurality of servers 134 that it positively identifies as a HomeSpace. In some embodiments, the mapping tool 114 is configured to explore the enterprise file servers 150 by obtaining and reviewing the directories on each server and evaluating the paths of each network storage area therein, including folders and other storage devices and resources.

With regard to identifying a particular network storage area as a HomeSpace, according to some embodiments, the mapping tool 114 is configured to utilize conventional naming techniques for paths in the communication network 102 to identify those paths of network storage areas within the enterprise file servers 150 that include an indicator, based on the conventional naming techniques, that the particular storage areas associated with those paths are accessed and used by only one user, and are therefore HomeSpaces. In accordance with some embodiments of the invention, each user of the communication network 102 is assigned to at least one user identification and those user identifications are the indicators that the mapping tool 114 attempts to locate within paths when identifying HomeSpaces. In such embodiments, it is the convention that the paths of HomeSpaces on the communication network 102 include the user's user identification. On the other hand, paths of shared network storage areas do not include user identifications. Therefore, the mapping tool 114 may explore the directories of each server within the plurality of servers, evaluate each path in turn, and make a determination as to whether or not the path includes a user identification.

If it is determined that the path includes the designated indicator, for example, a user identification, the mapping tool 114 is configured to positively identify the particular network storage area identified by that path as a HomeSpace and transmit to the database server 120 the particular user identification and the path of the HomeSpace. When that information is received by the database server 120, the database server 120 uses the user identification to link the particular HomeSpace to the custodian in the Unified Directory 122 associated with that user identification. In some embodiments, the mapping tool 114 is also configured to recognize and transmit, and the database server 120 is configured to house, an indication of the last time the HomeSpace was accessed by the particular user, for example, the last time any data was read from and/or written to the HomeSpace. Additionally, in some embodiments, the mapping tool 114 is configured to recognize when multiple paths map to the same network storage area. The collection server 130 compares paths for the same user to determine if duplicative entries exist. This advantageously enables avoidance of multiple collections of the same data. Thus, the profile scanning tool 112 ultimately generates a list of HomeSpaces used by each custodian, and this list may be presented to the e-discovery manager when a collection of a custodian's HomeSpaces is initialized, as discussed in detail below.

In addition to storing a list of personal computers and HomeSpaces used by a particular custodian, which lists were generated by the profile scanning tool 112 and the mapping tool 114 respectively, in accordance with some embodiments of the present invention, the database server 120 is also configured to store a list of any shared network storage areas used by the custodian. As used herein, a shared network storage area is a network storage area associated with multiple users who read data from and/or write data to it. Shared network storage areas may also be in the form of network storage devices or folders or other resources within network storage devices and may be referred to hereafter for clarity purposes as "Shared Drives." The user interface 118 is configured to receive a path of a Shared Drive input by the e-discovery manager and store the path in the Unified Directory 122 in relation to one or more custodians' human resources identifier(s). More particularly, in some embodiments, once a particular user of the communication network 102 is chosen for the collection process, the e-discovery manager may undertake to identify the particular shared network resources that that individual is using, and eventually, the paths associated with those shared network resources. This may be accomplished through conversations with the particular individual, by utilizing data returned from the local collection tool 132 executed on collection server 130 (shown in the block diagram of FIG. 4) deployed to the particular user's machine (as discussed in detail below), and/or by utilizing a file browsing tool 116 executed on electronic discovery manager server 110 (as shown in FIG. 2).

According to some embodiments of the present invention, the file browsing tool 116 is configured to be utilized by the e-discovery manager through the user interface 118. The file browsing tool 116 gives the e-discovery manager elevated authority within the communication network 102 to access, in a limited manner, the enterprise file servers 150 within the communication network 102. While the file browsing tool 116 may not allow access to the actual files stored on certain file servers, it allows the e-discovery manager to browse through the directories of the file servers 150, locate files that have been accessed by the custodian, and determine the size of the files. In accordance with some embodiments, the e-discovery manager may initially have a general idea of a particular file server within the enterprise file servers 150 that the custodian has used in the past. For example, the custodian may communicate to the e-discovery manager a particular folder name and/or drive name on which he/she has stored files. Additionally, in some embodiments, the e-discovery manager may have already undertaken a local collection process on the custodian's machine, wherein the local collection tool 132 returned a list of the network resources that the user of that machine has used. In that event, the e-discovery manager may be aware of the particular drive referenced by the user. The e-discovery manager may then employ the file browsing tool 116 to browse out to the particular drive mentioned, scan the folders for any folder having a name resembling that name given by the user, identify any particular files created by and/or accessed by the user, determine the size of such files, and retrieve the path of any folder (or Shared Drive) including data belonging to the user.

The retrieved paths of the Shared Drives may then be added, either manually or automatically, to the Unified Directory 122 in the database server 120. Thus, the Unified Directory 122 may store in connection with one custodian (and in particular in relation to the custodian's human resources identifier) a list of the personal computers, HomeSpaces, and Shared Drives associated with that custodian. Each of these locations is a potential source of data stored by the custodian, and once an investigation or collection of a custodian is initiated, the location information stored in the Unified Directory 122 may be accessed to determine the particular storage locations that need to be addressed during the investigation/collection. This is advantageous as it allows a completely automated investigation/collection process, rather than relying on the e-discovery manager to manually input the targeted machines and file servers at the time of collection.

It should be noted that the Unified Directory 122 may be regularly or continuously updated as new information is gathered using the tools described herein. More particularly, the electronic discovery management server 110 may be configured to automatically retrieve data from the human resources databases and Active Directory and any other relevant sources, such as information technology directories or lists, as well as deploy the profile scanning tool 112 and the mapping tool 114, at regularly scheduled intervals. Alternatively, rather than periodically retrieving data from the various data sources such as the human resources databases, the system 100 may be configured such that the database server 120 is continuously interfacing with the data sources such that the Unified Directory 122 is updated in real-time as the data within the data sources change. In either instance, each of the feeds of information into the Unified Directory 122 is regularly updated to ensure that the data in the Unified Directory 122 is current.

In some embodiments, the database server 120 is configured such that all historical data relating to a custodian is stored in relation to that custodian's human resources identifier in the Unified Directory 122. Thus, when the feeds of information into the Unified Directory 122 are updated, in the event data relating to the custodian has changed, the database server 120 is configured to store in the Unified Directory 122 the new data and any relevant metadata, including, for example, the time and date of the change, as well as maintain a record of the old data so that it is still a part of the custodian's profile in the Unified Directory 122. For example, in the event the profile scanning tool 114 identifies a new personal computer associated with a custodian and one of the personal computers associated with the custodian previously is no longer identified, the database server 120 is configured to store in the Unified Directory 122 the information for each computer, as well as indications as to when the new computer was first identified and when the old computer was no longer identified. In this way, the custodian profile within the Unified Database 122 may include a history of the personal computers used by the custodian. Such information may be relevant at the time of investigation or collection of the custodian.

One feed of information into the Unified Directory 122 which is particularly relevant to electronic discovery is employment status. According to some embodiments, when the feed of information from the human resources databases to the Unified Directory 122 includes a change as to employment status of a particular custodian, the electronic discovery management server 110 is configured to recognize the change and possibly perform particular functions in response. More specifically, in the event it is recorded in the Unified Directory 122 that the employment status of a particular custodian changes from active to terminated, the electronic discovery management server 110 is configured to determine whether the custodian is assigned to any case or matter, and, if so, to transmit to the designated manager or contact for the case or matter an electronic communication notifying the manager of the terminated status and inquiring as to whether the manager would like the terminated custodian's data collected. In the event the manager responds in the affirmative, the electronic discovery management server 110 is configured to automatically initiate the various collection processes of the present invention. Therefore, the custodian's data may be advantageously collected prior to any destruction or unavailability that could be caused by the termination. Alternatively, in other embodiments, the electronic discovery management server 110 may not communicate with the manager and may automatically initiate collection upon recognizing a change in employment status.

Case

With regard to case management processes, according to some embodiments, a case may be initialized by the e-discovery manager utilizing the user interface 118. In this regard, the e-discovery manager may enter into the user interface 118 certain information about a particular matter or case, such as a case name and/or number, a short description of the matter/case, a legal identifier, the particular requester (i.e., who asked for the case to be opened), managers or contacts for the matter (i.e., individuals involved in the substance of the matter rather than the process, like the e-discovery manager), custodians, etc. The electronic discovery management server 110 is configured to store this information in the case database 124 in the database server 120. The case database 124 is configured to house this information such that all information relating to a particular matter or case is related within the case database 124 and a user can use the user interface 118 to view a profile of the matter or case including all the information.

Once the matter and/or case has been initialized, the e-discovery manager may add custodians to the matter or case. In some embodiments, the electronic discovery management server 110 is configured to add numerous custodians to a single matter or case at one time. In this regard, the e-discovery manager may use the user interface 118 to enter in identifying information about the custodians. The identifying information for each custodian does not have to be of the same type. For example, a name may be entered for one custodian, an email address for another, a network user identification for another, and a human resources identifier for another. The user interface 118 is configured to receive the identifying information in different input areas depending upon the type of identifying information being received. The electronic discovery management server 110 is configured to use the input information to search the Unified Directory 122 in the database server 120 to determine which custodians are associated with the input information. In the case of a human resources identifier being entered, only one custodian in the Unified Directory 122 may be a match. On the other hand, in the case of a name being entered, multiple custodians may be a match.

The electronic discovery management server 110, after searching the Unified Directory 122 with the input identifying information, is configured to present through the user interface 118 a list of all custodians matching the input identifying information. In the event only one match was returned for a particular set of input identifying information, the electronic discovery management server 110 is configured to automatically select the custodian to be added to the case or matter. On the other hand, in the event more than one match was located for a particular set of input identifying information, then the multiple matches may be presented together to the e-discovery manager through the user interface 118 and marked so that the e-discovery manager must review the multiple custodian profiles associated with the matches to determine the correct custodian that should be added to the case or matter. In doing so, the e-discovery manager may consider the other information in the profiles, such as corporate title, work location, associated custodians, etc. Such information can inform the e-discovery manager as to whether the located custodian is the one intended. The e-discovery manager may then select the correct custodian for addition to the case or matter and confirm that all custodians selected may be added to the case or matter. According to some embodiments, "adding" a custodian to a case or matter involves linking correlating the custodian profile in the Unified Directory 122 to the case or matter in the Case database 124.

According to some embodiments, upon adding custodians to a matter, the electronic discovery management server 110 is configured to initiate the transmission of preservation notices and surveys to the custodians. In this regard, preservation notices and surveys relevant to the particular case or matter are stored in or linked to the case profile in the case database 124. Transmission of the preservation notices and surveys to custodians added to the case may be automated, for example, there may be preset instructions within the case profile that cause the electronic discovery management server 110 to transmit a particular preservation notice and survey at a particular date or time or upon a particular triggering event, such as a custodian being added to the case, or the e-discovery manager may manually cause the preservation notices and surveys to be transmitted. In some embodiments, the electronic discovery management server 110 is configured to transmit the preservation notices and surveys via a standard email function. The surveys may be tied to the preservation notices such that they are transmitted to custodians together, and one survey may be tied to more than one preservation notice. When a custodian responds to a survey, the survey response is received by the electronic discovery management server 110 and stored in relation to the relevant custodian in the case profile in the case database 124. Furthermore, the electronic discovery management server 110 may be configured to store all or a portion of the data received in the survey response in the Unified Directory 122 in the custodian's profile.

According to some embodiments, each transmission of a preservation notice and survey to a custodian, and each corresponding response, is tracked in the relevant case profile in the case database 124. The electronic discovery management server 110 may also be configured to transmit reminder notices if responses to the surveys are not received within a predefined period of time. The electronic discovery management server 110 may also be configured to schedule reminder notices to be sent to custodians to periodically refresh the custodians' memory of their duty to preserve files/documents pertaining to the matter. In some embodiments, once a preservation notice has been sent to a custodian, the electronic discovery management server 110 may undertake to prevent any reimaging or refreshing of the custodian's personal computer(s) by transmitting an alert of the preservation notice to the enterprise's information technology management group. In addition, the survey responses received from custodians serve to inform the collection process. For example, one survey may inquire as to what network storage devices the custodian uses when storing data. The answer that the custodian gives to the survey may inform the addition of Shared Drives to the custodian profile in the Unified Database 122 that may be used later in collection.

According to some embodiments of the present invention, the e-discovery manager may utilize the user interface 118 to add attachments, notes, tasks, and search terms to a case or matter. In some embodiments, the contacts/managers for a case may also access the case profile in the case database 124 using a web browser and may add attachments, notes, tasks, and search terms to be stored therein. Thus, the e-discovery manager may not be the only entity with access to the case and case management tools of the electronic discovery management server 110. The subject matter of the attachments, notes and tasks could be anything relevant to the case or matter. In some embodiments, the tasks are tasks that particular custodians must complete and the electronic discovery management server 110 is configured to transmit a notice to the custodians that that the task needs to be completed, perhaps using standard email functions. With regard to attachments, the e-discovery manager, or the contact/manager of the case, may upload relevant files to be attached to the case profile.

With regard to the search terms, the e-discovery manager or the case contacts or managers may add certain terms to the case profile to be applied when searching the collected data to locate data responsive or relevant to the underlying issues in the case. Storing the search terms within the case profile is advantageous as it creates a record of the searching that is to be undertaken with respect to the data and aids in organization of the data, as discussed further below.

According to some embodiments of the present invention, when a decision is made that it is time to collect from certain custodians in a matter, the e-discovery manager may use the user interface 118 to release the custodians from the matter to the underlying case. This release triggers the commencement of collection of the custodians' data. In some embodiments, the electronic discovery management server 110 is configured to allow all custodians assigned to the matter to be released to the case at the same time. In addition, in instances where the e-discovery manager has previously created groups of custodians within the case, the electronic discovery management server 110 is configured to allow a group of custodians to be released from a matter to a case at the same time.

Data

Once a custodian has been identified for collection, whether manually by the e-discovery manager or by being released from a matter to a case, the electronic discovery system 100 is configured to automatically collect the custodian's data using the location information stored in the Unified Directory 122. Therefore, the electronic discovery management server 110 accesses the custodian profile of the custodian to be collected in the Unified Directory 122 and determines, from the information stored therein, the different locations of data storage for the particular custodian that must be collected. There are many different locations that the system 100 can address, including personal computers, email accounts, and network storage areas, including HomeSpaces and Shared Drives.

If a custodian profile (for a custodian released for collection) includes at least one personal computer(s) associated with the custodian, then the electronic discovery management server 110 may undertake to collect the files on these machines. Therefore, the electronic discovery management server 110 may retrieve the relevant machine identifying information, such as domain, name, IP address, etc., and may initialize deployment of a local collection tool 132 running on collections server 130 (as shown in FIG. 4).

The local collection tool 132 is configured to be deployed from the collections server 130 or another server within the network 102 to any of the enterprise personal computers 140. Therefore, for a particular custodian, the local collection tool 132 is configured to utilize the machine identifying information supplied by the electronic discovery management server 110 to be deployed to the identified custodian computer. According to one embodiment, the local collection tool 132 is configured to be automatically installed on the target custodian's personal computer. The local collection tool 132 is further configured to generate a snapshot of the data residing on the local storage of the personal computer 140, for example, by using a commercially available tool such as the Volume Shadow Copy Service, store the snapshot in a storage area on the personal computer, and transmit copies of the files included in the snapshot to the collections server 130. By transmitting the data from the snapshot of the data stored on the hard drive of the personal computer, the local collection tool 132 advantageously allows the custodian to continue to use her machine without substantial interference from the local collection tool 132 and even interact with the data stored on the hard drive as the snapshot of the data is being transmitted to the collections server 130.

In addition to the functions described above, the local collection tool 132 may also be configured to transmit to the database server 120 a catalog of the files included in the snapshot to be stored in the ongoing collections database. This catalog may be referenced by the collections server 130 in order to determine whether collection is complete and to resume interrupted collections at the point of interruption. Additionally, in accordance with some embodiments, the local collection tool 132 is configured to compile and transmit to the electronic discovery management server 110 a list of network resources the user is using, including, for example, network applications and file servers that the user has used or accessed. This list of resources may be stored in the database server 120 in the custodian's profile in the Unified Directory 122. With regard to transmission of the files themselves, according to one embodiment of the invention, the local collection tool 132 is configured to compress, hash, and upload the files included in the snapshot to the collections server 130.

In some embodiments, the electronic discovery management server 110 may utilize a computer watching tool 117 to determine when to attempt a collection from a custodian's machine. The computer watching tool 117 is configured to monitor the network 102 and determine which of the enterprise personal computers 140 are online. Therefore, in the event there is a custodian whose local machine needs to be collected, the computer watching tool 117 is configured to determine when that machine joins the network 102 (i.e., when it appears to the computer watching tool 117) and inform the electronic discovery management server 110 that it should initialize the local collection tool 132 immediately.

If a custodian profile (for a custodian released for collection) includes any paths for HomeSpaces or Shared Drives, then the electronic discovery management server 110 may undertake to collect the files from these file servers by initializing the file server collection tool 134 running on collection server 130 (as shown in FIG. 4). The file server collection tool 134 is configured to access the file server located at the given path, whether the file server is a HomeSpace or a Shared Drive, copy the data residing on the file server, and compress, hash, and transmit the copied data to the collections server 130. The file server collection tool 134 may be programmed with preset instructions that allow it to only copy files meeting certain criteria, for example, files that have certain file extensions. Alternatively, the programmed instructions may prevent the file server collection tool 134 from copying files having certain file extensions or other attributes. Either of the foregoing is advantageous if the e-discovery manager is not interested in copying executable files or source code, for example. In some embodiments, the file server collection tool 134 is also configured to generate a size estimate of the files residing on the targeted file server. In one embodiment, the file server collection tool 134 may automatically begin the collection process (copying and transmitting data) if the size estimate falls below a predetermined threshold. In addition, in some embodiments, the file server collection tool 134 is configured to determine whether a particular folder that it is collecting from a file server includes more than a token amount of nearline files, and, in the event that the folder does include such nearline files, choose to not collect such files so as to avoid overloading the server. Therefore, according to different embodiments, the file server collection tool 134 copies all or a portion of the files residing on a file server located at the path given in the released custodian's profile and transmits them to the collections server 130.

If a custodian profile (for a custodian released for collection) includes an email address for an email account on the enterprise email server 160, then the electronic discovery management server 110 may undertake to collect the files from the enterprise email server 160 by initializing the active email collection tool 136 running on collections server 130 (as shown in FIG. 4). In some embodiments, the active email collection tool 136 is configured to access the particular Microsoft Exchange server within the enterprise email server 160 on which the custodian's account resides (which is known based on the information included in the Unified Directory 122), copy all email located there, including emails deleted by the custodian up to a predetermined period of time prior to the collection, (for example, seven days prior to the collection) and transmit the copied emails to the collections server 130.

Regardless of the storage resource location from which data is being collected, or the particular type of data being collected, in one embodiment of the invention the collections server 130 is configured to store the data first (while the collection is still ongoing) in the short-term staging drive 180 until the particular collection is complete, attach a barcode to the set of data resulting from the particular collection, and then copy the data set to the long-term storage area network 190 for permanent storage. Furthermore, the collections server 130 transmits the barcode information to the electronic discovery management server 110 to be stored in the database server 120, for example, in the custodian's profile in the Unified Database 122, in relation to the stored information about the particular collection, whether it was a local collection, an active email collection, a file server collection, etc. Therefore, the barcode can be used for reference at a later date to determine the origin of the data. After the data has been copied to the long-term storage area network 190, the collections server 130 compares the hashing of the data in permanent storage to the original data in the staging drive 180 and, if the hashing is identical, purges the data from the staging drive 180.

Once the data has entered the long-term storage area network 190, it is not necessarily ready for review. Indeed, it is likely that the data may need to be processed before it is searchable and suitable for review by investigators and attorneys. For example, the files may be encrypted in the form in which they are collected and sent to the long-term storage area network 190. Therefore, according to some embodiments, the data may be copied to the conversion services server 170 where a series of decryption and standardization functions may be applied to it. After the data is decrypted and standardized, it is returned to the long-term storage area network 190 and may remain there to be accessed for review purposes.

With reference now to FIG. 11, a block diagram is provided that illustrates the electronic discovery management structure of the present invention, according to some embodiments. As illustrated in FIG. 11, certain processes described herein may be categorized within one of case management, as represented by Block 200, custodian management, as represented by Block 220, or data management, as represented by Block 240. As described above, the electronic discovery system 100 is arranged such that cases, custodians and data may be managed independent of one another. However, there is still an element of the categorization of processes within the categories that is conceptual, and it should be understood that certain processes may be correctly assigned to more than one category. Therefore, while the architecture of the system 100 allows separate management of custodians, cases, and data, certain processes of the present invention may affect more than one of the foregoing.

The first process that falls within the case management category is creation of a matter or case as a framework for litigation support activities, as shown in Block 202. As described above, the e-discovery manager may enter into the user interface 118 certain information about a particular matter or case, such as a case name and/or number, a short description of the matter/case, a legal identifier, the particular requester (i.e., who asked for the case to be opened), managers or contacts for the matter (i.e., individuals involved in the substance of the matter rather than the process, like the e-discovery manager) etc.

It is noted that custodian information is stored separately from the case information allowing for the same custodian in multiple cases. This provides for the electronic discovery system of the present invention to have scalability, whereby evidence associated with one custodian may be used in multiple cases.

The electronic discovery management server 110 stores this information in the case database 124 in the database server 120. The case database 124 houses this information such that all information relating to a particular matter or case is related within the case database 124 and a user, such as a manager or contact, can use the user interface 118 to view and edit a profile of the matter or case.

The next process within case management is the creation of preservation notices and surveys specific to the matter, as shown in Block 204. In this regard, the e-discovery manager may, through the user interface 118, either generate a new preservation notices or surveys relevant to the particular case or matter to be stored in the case profile in the case database 124 or, alternatively, link a preservation notice or survey already stored in the database server 120 to the case profile of the specific case or matter at issue. Also within case management is the creation of search terms pertinent to the case, as represented by Block 206. As described above, the e-discovery manager or a contact or manager for the case may use the user interface 118 to input individual search terms or search term sets to be applied to the data harvested in the case. In some embodiments, the search terms may be limited to be used with particular custodians and/or with particular harvested data types. The search terms will be saved in the case database 124 so that they may be readily applied to harvested data and used in connection with storing the resulting responsive data.

The processes of entering relevant attachments, notes and updates to a particular case or matter also falls within the case management category, as demonstrated by Blocks 208 and 210. The e-discovery manager or a case contact or manager may use the user interface 118 to upload documents and enter notes and other relevant data, including updates and reminders, to be stored in the case profile of the case in the case database 124. Once these attachments, notes and updates are added, they may be referenced whenever a user views the case profile through the user interface 118. The cost estimation modules of the present invention are also processes that are categorized as case management processes, as shown in Block 212. In this regard, the electronic discovery management server 110 utilizes a cost estimation tool to determine the cost of harvesting and reviewing data, based on a number of factors including, for example, number of custodians, amount of harvested data, data types, etc. Finally, case management also includes a number of tasking and workflow processes that are represented by block 214.

Moving now to custodian management, certain processes falling within the category of custodian management are shown in Block 220. While the processes involving generation of the Unified Directory 122 certainly could be categorized as custodian management, the processes shown in FIG. 11 include those processes involving management of custodians within the scope of a case or matter. In that regard, the first process of custodian management included in FIG. 11 is the addition of custodians to a case or matter, as shown in Block 222. As described above, the e-discovery manager may use the user interface 118 to link a custodian's profile from the Unified Directory 122 to the particular case profile in the case database 124. Thus, the custodian profile and case profile are correlated. The next processes within custodian management is the transmission of preservation notices and surveys to custodians, as shown in Block 224, and the presentation of the surveys to custodians, as shown in Block 226. The electronic discovery management server 110 uses the contact information in the custodian's profile in the Unified Directory 122 to transmit the preservation notice(s) and survey(s) stored in the case profile to the custodian. In some embodiments, a standard email function is used, so that the only information needed from the Unified Directory 122 is the custodian's email address. When the custodian checks her email, the survey will appear as a message therein, and when she opens that message, the survey will be presented to her. The survey may be configured such that when she fills it out, the survey is automatically transmitted back to the database server 120 for storage in the case profile and the custodian's profile.

Also falling within custodian management is the process of releasing custodians from a matter to a case, as shown in Block 228. The e-discovery manager uses the user interface 118 to mark the custodian's profile so that the custodian is now activated for collection of data. This may occur within the case database 124 since the custodian's profile is linked thereto. Once the custodian is released/marked, the electronic discovery management server 110 may access the custodian's profile and initialize collection based on the various data storage locations identified in the profile. Therefore, as represented by Block 230, the electronic discovery management server 110 may automatically determine the data types and locations of data to be harvested by accessing the custodian's profile in the Unified Directory 122. Alternatively, the e-discovery manager may manually make the same determination by accessing and viewing the custodian's profile. Finally, as with case management, custodian management also includes a number of tasking and workflow processes that are represented by Block 232.

The last category is data management, represented by Block 240. One major set of processes within data management are the processes relating to the harvesting of data, as shown in Block 242. These processes include the collection of data from all the different storage areas of a particular custodian, including the custodian's local storage on her personal computer(s), the custodian's network storage areas, the custodian's email, and any other areas, as are described herein. All of the data in the various storage areas is copied and transmitted to the collections server 130, as described in detail for each particular collection tool or process. Upon reaching the collections server 130, data resulting from a particular collection is temporarily stored in the short-term staging drive 180 until the collection is complete, at which point it is stored in the long-term storage area network 190 in association with a specific identifying barcode. The foregoing process is represented by Block 244. The data may require decryption or standardization functions to be applied to it in order for it to be searchable and/or otherwise usable, so the next process that falls within data management is the copying of the data to the conversion services server 170 for analysis and conversion as necessary, as shown in Block 246. Once the data is converted, it is returned to the long-term storage area network 190 to be used in review.

Also falling within data management is the association of particular data sets with particular sets of search terms stored in the case profile of the case database 124. In this regard, certain search terms stored in the case profile are stored with the intention of being applied to certain types of data and/or certain custodian's data. Alternatively, certain search terms may be applied to all data collected for a specific case. In either instance, the electronic discovery management server 110 accesses the case profile, determines the search terms to be applied, and associates the search terms with the barcode of the appropriate data sets in long-term storage. Thus, the search terms will be applied to that data and the results will be generated and presented to reviewers for analysis. Finally, as with the other management categories, data management also includes a number of tasking and workflow processes that are represented by Block 250.

With reference to FIG. 12, an exemplary process for managing a case is provided, in accordance with one embodiment of the present invention. As represented by Block 302, a case or matter is created by the e-discovery manager and stored in the case database 124. Next, custodians are added to the case, as shown in Block 304, by linking the custodian profiles of the Unified Directory 122 to the case profile. Next, as represented by Block 306, the e-discovery manager and/or the case contact or manager adds search terms to be applied to data harvested for the case, including instructions as to applying the search terms to particular data types or custodians. Block 310 represents the determination that must be made as to whether there is a matter or just a case. If there is no matter because preservation notices are not required, for example, for an audit, then the process will move straight to the initialization of data collection. On the other hand, if there is matter, rather than just a case, then the creation of preservation notices is required, as shown in Block 312.

The preservation notice, as shown in Block 314 is transmitted to the custodians added to the matter, perhaps using email. As shown in Block 316, a reminder notice module may be employed. As shown in Block 318, the reminder notice module transmits periodic reminder notices to custodians. The notices may be sent over email and may remind custodians about the preservation notice and/or remind custodians to fill out surveys. With regard to surveys, in the event a survey is required or desired, according to Block 320, a survey is created. The survey may be saved in the case profile in the case database 124. As shown in Block 322, it is possible to enable the survey to be attached to and transmitted with the preservation notices.

Next, as shown in Block 324, the e-discovery manager may release custodians from the matter to the case, which initialized collection of the custodian's data. As shown in Block 326, the e-discovery manager or the electronic discovery management server 122 accesses the custodian profile, determines the data types and location to be collected, and initializes the applicable collection tools to go collect the data. Once the data has been collected and a unique barcode has been assigned to each dataset based on the particular custodian and storage location from which it originated, as shown in Block 328, the search terms previously stored in the case profile may be assigned to the dataset based on the input instructions regarding the search terms. These search terms may be applied to the dataset and the results saved to be presented to reviewers for analysis.

With reference to FIG. 13, an exemplary process for managing a custodian is provided, in accordance with one embodiment of the present invention. First, as represented by Block 402, a custodian is added to a matter or case. In this regard, the custodian's profile in the Unified Directory 122 is linked to the relevant case or matter profile. In order to locate the custodian's profile, a custodian search module may be employed, as shown in Block 404. Therefore, the e-discovery manager may enter any identifying information about the custodian, whether it is the custodian's name, network user identification, email address, etc. The custodian search module will take the input information and search the Unified Directory 122 for a match. If more than one match is obtained, the user interface 118 will present all matches and allow the e-discovery manager to browse the associated profiles to determine the intended custodian. In this way, the correct custodian is identified and the profile of that custodian is linked to the appropriate case or matter.

As represented by Block 406, the electronic discovery management server 110 may determine whether the particular custodian added is a member of the enterprise "do-not-call list." In this regard, there may be an indication in the custodian's profile in the Unified Directory 122 that the particular custodian should not be contacted regarding collections, and an alternative contact should be used, such as an administrative assistant of the custodian. Alternatively, there may be a separate do-not-call list stored in the database server 120 that must be accessed and searched to determine whether or not the custodian appears on that list. In either instance, a determination is made as to whether or not the custodian should be directly contacted, and in the event the custodian should not be directly contacted, the contact information for the custodian's assistant (or other stand-in) should be obtained. This information will be used later for transmitting preservation notices and surveys.

Next, in accordance with Block 408, a determination is made by the electronic discovery management server 110 as to whether the custodian has been added to a matter or a case. If it is a case, then the custodian is verified, as shown in Block 424, supplemental data may be added to the custodian profile in the Unified Directory 122 as required, as shown in Block 426, and then the various collection tools are initialized by the electronic discovery management server 110 for collection of the custodian's data, as shown in Block 428. On the other hand, if it is a matter, then preservation notices are required. Therefore, as shown in Block 410, a preservation notice is sent via email to the custodian or custodian stand-in. As shown in Block 412, the custodian may then be inactivated from the case because, for some reason, data does not need to be collected from the custodian. In the future, when it comes time to collect from the custodian, the custodian will be reactivated, as shown in Block 422.

After a preservation notice is sent, a determination is made by the electronic discovery management server 110 as to whether a survey is required, as shown in Block 414. It should be noted that in alternate embodiments the decision on whether to send a survey may be made prior to sending the preservation notice. In such alternate embodiments, if the survey is required, it may become a component of the preservation notice and, thus, accessed simultaneously by the custodian. If a survey is required, it is transmitted in conjunction with a preservation notice, and the answers are collected by the electronic discovery management server 110 and stored in the database server 120, as shown in Block 416. Reminder notices for the preservation notices and surveys may also be transmitted to the custodian, as shown in Block 420. Next, once it is time to collect data, the custodian is released from the matter to the case, as shown in Block 418, and the various collection tools are initialized by the electronic discovery management server 110 for collection of the custodian's data, as shown in Block 428. In this process, the custodian's profile in the Unified Directory 122 is accessed in order to determine the various locations where the custodian may have stored data. Finally, as shown in Block 430, the custodian's data is collected.

Referring to FIGS. 14 and 15, flow diagrams are presented of a method 500 for harvest data from various data sources, in accordance with embodiments of the present invention. At Event 502, the collection of data ensues and, at Event 504, the type of data is identified. Data Block 506 signifies active email that is collected from an exchange system or the like. At Event 508 the automated active email collection tool is implemented to collect email from identified email address. As previously noted, and in accordance with present embodiments of the invention, if a custodian profile (for a custodian released for collection) includes an email address for an email account on the enterprise email server (160), then the electronic discovery management server (110) may undertake to collect the files from the enterprise email server (160) by initializing the active email collection tool (136) running on collections server (130). In some embodiments, the active email collection tool (136) is configured to access the particular Microsoft Exchange server within the enterprise email server 160 on which the custodian's account resides (which is known based on the information included in the Unified Directory 122), copy all email located there, including emails deleted up to a designated prior period, for example, seven days prior to the collection, and transmit the copied emails to the collections server (130). The email collection tool is also capable of implementing bulk requests and for collecting email on a scheduled basis, such as daily. The email collection tool is additionally capable of being implementing enterprise wide and requires no server identifiers or the like to collect the active email. In this regard, the email collection tool (136) serves to reduce security risk.

At Event 510, a barcoding tool is implemented at a staging location, such as short-term staging drive (180) to attach a barcode to the set of email resulting from the particular collection. The barcoded data is then copied and communicated to the long-term storage area network (190) for permanent storage. Furthermore, the collections server (130) transmits the barcode information to the electronic discovery management server (110) to be stored in the database server (120), for example, in the custodian's profile in the Unified Database (122), in relation to the stored information about the particular collection. Therefore, the barcode can be used for reference at a later date to determine the origin of the data. After the data has been copied to the long-term storage area network (190), the collections server (130) compares the hashing of the data in permanent storage to the original data in the staging drive (180) and, if the hashing is identical, purges the data from the staging drive (180). As such, barcoding is performed without the need to execute the barcoding tool on an exchange server and, as such no human intervention is needed in the barcode process. In accordance with embodiments of the present invention, one barcode may be assigned per custodian, per data type and per event (i.e., case, matter, etc.)

At Event 512, the collected email data may be associated with a specific search term set or sets. When the search terms are applied, a listing of the files and documents including those terms (the "search term hit list") are presented to the reviewer and also stored in the database server (120). The reviewer may provide an indication of this to the electronic discovery management server 110, which may then make a determination that other documents within the search term hit list are more likely to be responsive.

At Event 514, the collected and barcoded active email data is copied to a processing drive for subsequent analysis. It should be noted that the nature of email data obviates the need to perform conversion and/or decryption on the data set. At Event 516, the active email data set is loaded into the analysis tool and, at Event 518, the data set is exported to the requestor/reviewer for analysis.

Data Block 520 signifies other non-exchange server based email, such as email accessed through a client-server, collaborative application, such as Lotus Notes® or the like. At Event 522, NSF files or any other file types associated with non-exchange server based email is manually harvested from an enterprise-grade email server having collaborative capabilities, such as a Lotus Domino server or the like.

At Event 522, a barcoding tool is implemented at a staging location, such as short-term staging drive (180) to attach a barcode to the set of non-exchange server email resulting from the particular collection. The barcoded data is then copied and communicated to the long-term storage area network (190) for permanent storage. Furthermore, the collections server (130) transmits the barcode information to the electronic discovery management server (110) to be stored in the database server (120), for example, in the custodian's profile in the Unified Database (122), in relation to the stored information about the particular collection. Therefore, the barcode can be used for reference at a later date to determine the origin of the data. After the data has been copied to the long-term storage area network (190), the collections server (130) compares the hashing of the data in permanent storage to the original data in the staging drive (180) and, if the hashing is identical, purges the data from the staging drive (180).

At Event 526, the collected non-exchange server email data may be associated with a specific search term set or sets. When the search terms are applied, a listing of the files and documents including those terms (the "search term hit list") are presented to the reviewer and also stored in the database server (120). The reviewer may provide an indication of this to the electronic discovery management server 110, which may then make a determination that other documents within the search term hit list are more likely to be responsive.

At Event 528, the NSF files or any other file types associated with non-exchange server based email that may be encrypted is decrypted using a decryption tool, in accordance with embodiments of the present invention. The encryption of NSF files occurs at the user level and, therefore only the user has the password necessary for decryption. The decryption tool allows for decryption of the NSF file-type data without the knowledge of the user/encrypter. The decryption tool finds ID files that exist anywhere in the enterprise system, creates a database of the ID files, associates the database with the user/encrypter and subsequently decrypts the data.

At Event 530, the non-exchange server email data set is loaded into the analysis tool and, at Event 532, the data set is exported to the requestor/reviewer for analysis.

Data Block 534 signifies journaled data, such as electronic commerce data stored on a repository for the purpose of regulation, compliance to regulating bodies, such as the Securities and Exchange Commission (SEC) or the like. At Event 536, criteria is extracted from input system and manually entered in a designated third party system for data retrieval.

At Event 538, the barcoding tool is implemented at a staging location, such as short-term staging drive (180) to attach a barcode to the set of journaled data resulting from the particular collection. The barcoded data is then copied and communicated to the long-term storage area network (190) for permanent storage. At Event 540, the collected and barcoded journaled data may be associated with a specific search term set or sets.

At Event 542 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source to processing file conversions may be required on EML formatted files, MSG formatted files and the like.

At Event 544, the journaled data set is loaded into the analysis tool and, at Event 546, the journaled data set is exported to the requestor/reviewer for analysis.

Referring to FIG. 15, data block 548 signifies data from a local Personal Computer (PC), such as enterprise PC (140). At Event 550, the local collection tool (132) is implemented to collect data from designated PCs by taking a "snapshot" of the device's hard drive. According to one embodiment of the invention, the local collection tool may be autodeployed thus, obviating the need for any manual entry by the e-discovery manager or the like. In other embodiments of the invention, the local collection tool (132) may be employed to collect data from network storage.

At Event 552, the barcoding tool is implemented at a staging location, such as short-term staging drive (180) to attach a barcode to the set of local PC data resulting from the particular collection. The barcoded data is then copied and communicated to the long-term storage area network (190) for permanent storage. At Event 554, the collected and barcoded local PC data may be associated with a specific search term set or sets.

At Event 556 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source to processing file conversions may be required on EML formatted files, MSG formatted files, IPD formatted files and the like.

At Event 558, the local PC files that may be encrypted are decrypted using a decryption tool, in accordance with embodiments of the present invention. The decryption tool allows for decryption of the PC files data without the knowledge of the user/encrypter. The decryption tool finds ID files that exist anywhere in the enterprise system, creates a database of the ID files, associates the database with the user/encrypter and subsequently decrypts the data.

At Event 560, the local PC data set is loaded into the analysis tool and, at Event 562, the local PC data set is exported to the requestor/reviewer for analysis.

Data block 564 signifies data from network storage, such as a shared drive or HomeSpace. At Event 566, the file server collection tool (134) is implemented to automatically collect data from shared drives and/or HomeSpace. According to one embodiment of the invention, the file server collection tool (134) may be autodeployed thus, obviating the need for any manual entry by the e-discovery manager or the like.

At Event 568, the barcoding tool is implemented at a staging location, such as short-term staging drive (180) to attach a barcode to the set of network storage data resulting from the particular collection. The barcoded data is then copied and communicated to the long-term storage area network (190) for permanent storage. At Event 570, the collected and barcoded network storage data may be associated with a specific search term set or sets.

At Event 572 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source to processing file conversions may be required on EML formatted files, MSG formatted files, IPD formatted files and the like.

At Event 574, the network storage files that may be encrypted are decrypted using a decryption tool, in accordance with embodiments of the present invention. The decryption tool allows for decryption of the network storage data without the knowledge of the user/encrypter. The decryption tool finds ID files that exist anywhere in the enterprise system, creates a database of the ID files, associates the database with the user/encrypter and subsequently decrypts the data.

At Event 576, the network storage data set is loaded into the analysis tool and, at Event 578, the network storage data set is exported to the requestor/reviewer for analysis.

Data block 580 signifies electronic data for forensics. At Event 582, a forensic collector tool, such as EnCase® may be executed on the devices of interest to collect data. According to one embodiment of the invention, the forensic collector tool may be automatically deployed on the device of interest without the knowledge of the device user. In accordance with another embodiment of the invention, a computer watcher tool may be implemented (not shown in FIG. 15) that watches the network to determine the addition or subtraction of computers to the network based on ID's/IP addresses returned from the network.

At Event 584, the barcoding tool is implemented at a staging location, such as short-term staging drive (180) to attach a barcode to the set of forensic data resulting from the particular collection. The barcoded data is then copied and communicated to the long-term storage area network (190) for permanent storage. At Event 586, the collected and barcoded forensic data may be associated with a specific search term set or sets.

At Event 588 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source to processing may be required on EML formatted files, MSG formatted files, IPD formatted files and the like.

At Event 590, the forensic files that may be encrypted are decrypted using a decryption tool, in accordance with embodiments of the present invention. The decryption tool allows for decryption of the network storage data without the knowledge of the user/encrypter. The decryption tool finds ID files that exist anywhere in the enterprise system, creates a database of the ID files, associates the database with the user/encrypter and subsequently decrypts the data.

At Event 592, the forensic data set is loaded into the analysis tool and, at Event 594, the network storage data set is exported to the requestor/reviewer for analysis.

Data block 596 signifies collaborative data, such as data residing at discovery sites, for example LiveLink® or the like. At Event 598, a discovery site collector tool 138, such as a LiveLink® collector tool may be executed on the devices of interest to collect data. According to one embodiment of the invention, generally, the discovery site collector tool 138 preserves at least a portion of the third party shared drive discovery site database in the e-discovery database, including all selected files and all revisions of the files. In this regard, the discovery site collector tool 138 queries against the database to define what files need to be retrieved, then copies those files based on the result of the query. Metadata pertaining to the files is retained in the case management system tables. In accordance with another embodiment of the invention, the discovery site collector tool 138 collects the documents and the related metadata and uses the metadata to automatically rename the files.

At Event 600, the barcoding tool is implemented at a staging location, such as short-term staging drive (180) to attach a barcode to the set of discovery site data resulting from the particular collection. The barcoded data is then copied and communicated to the long-term storage area network (190) for permanent storage. At Event 602, the collected and barcoded discovery site data may be associated with a specific search term set or sets.

At Event 604 source-to-processing is implemented to insure that any loose files are properly formatted in a standardized format. In this regard, according to one embodiment of the invention, loose files are examined for relevancy and, if relevant, stored in a proper data format, such as a PST file or the like. The metadata associated with the non-standardized files is retained and remains with the reformatted data files. Source to processing may be required on EML formatted files, MSG formatted files, IPD formatted files and the like.

At Event 606, the discovery site data set is loaded into the analysis tool and, at Event 608, the discovery site data set is exported to the requestor/reviewer for analysis.

Thus, present embodiments herein disclosed provide for improvements in electronic discovery. Embodiments herein disclosed provide for an enterprise wide electronic management server 110 that provides for data to be identified, located, retrieved, preserved, searched, reviewed and produced in an efficient and cost-effective manner across the entire enterprise system. In addition, by structuring management of e-discovery based on case/matter, custodian and data and providing for linkage between the same, further efficiencies are realized in terms of identifying, locating and retrieving data and leveraging results of previous e-discoveries with current requests.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method of collecting data from a shared drive for an electronic discovery system, comprising:
    sending, by a processing device, a request for the location of data on the shared drive through the electronic discovery system, and wherein the shared drive is a third party shared drive;
    receiving, by the processing device, a response indicating the location of the data on the shared drive through the electronic discovery system;
    identifying, by the processing device, the location of data at a node in a shared drive, wherein the data is data at the node location and all of the associated hierarchal data located below the node;
    capturing, by the processing device, the data from the shared drive;
    reassembling, by the processing device, the data captured into usable data with a file name that can be identified and searched by the electronic discovery system based on a custodian, case, or data;
    transferring, by the processing device, the data to the electronic discovery system.

2. The method of claim 1, further comprising:
    identifying, by the processing device, metadata associated with the data captured from the shared drive;
    capturing, by the processing device, the metadata associated with the data captured from the shared drive; and
    reconstructing, by the processing device, the data captured from the shared drive into accessible data for the electronic discovery system by utilizing the information contained in the metadata in order to reassemble the data captured into usable data.

3. The method of claim 1,
    wherein sending the inquiry comprises sending an inquire to a custodian requesting the location of the data on the shared drive using the processing device.

4. The method of claim 1,
    wherein receiving the location of the shared drive comprises receiving from a custodian a location identifier indicating the node location of the data on the shared drive using the processing device.

5. The method of claim 1, further comprising:
    identifying links to other data located outside of and associated with the data captured using the processing device.

6. The method of claim 5, further comprising:
    sending a follow up inquiry to a custodian presenting the links to the other data to the custodian using the processing device, wherein the custodian is asked if the other data should be captured.

7. The method of claim 5, further comprising:
    receiving from a custodian information indicating whether the other data should be captured and transferred to the electronic discovery system using the processing device.

8. A method of collecting data from a shared drive for an electronic discovery system, comprising:
    sending, by a processing device, a request for the location of data on the shared drive through the electronic discovery system, and wherein the shared drive is a third party shared drive;
    receiving, by the processing device, a response indicating the location of the data on the shared drive through the electronic discovery system;
    capturing, by the processing device, data from the shared drive;

identifying, by the processing device, metadata associated with the data captured from the shared drive;

capturing, by the processing device, the metadata associated with the data captured from the shared drive; and reconstructing, by the processing device, the data captured from the shared drive into accessible data for the electronic discovery system by utilizing the information contained in the metadata in order to reassemble the data captured into usable data that can be searched based on a custodian, case, or data.

9. The method of claim 8, further comprising:

identifying, by the processing device, the location of the data at the node in the shared drive, wherein the data captured is data at a node location and all of the associated hierarchal data located below the node;

reassembling the data captured into the usable data with a file name that can be identified and searched by the electronic discovery system using the reconstructed data from the information contained in the metadata; and transferring, by the processing device, the data to the electronic discovery system.

10. The method of claim 8, wherein sending the inquiry comprises sending an inquiry to a custodian requesting the location of the data on the shared drive, using the processing device.

11. The method of claim 8, wherein receiving the location of the shared drive comprises receiving from a custodian a location identifier indicating a node location of the data on the shared drive, using the processing device.

12. The method of claim 8, further comprising:

identifying links to other data located outside of and associated with the data captured, using the processing device.

13. The method of claim 12, further comprising:

sending a follow up inquiry to a custodian presenting the links to the other data to the custodian using the processing device, wherein the custodian is asked if the other data associated with the links should be captured.

14. The method of claim 12, further comprising:

receiving from a custodian information indicating whether the other data should be captured and transferred to the electronic discovery system, using the processing device.

15. A collection tool system, for collecting data from a shared drive for an electronic discovery system, comprising:

a memory device;

a communication device;

a processing device, operatively coupled to the memory device and the communication device, and configured to execute computer-readable program code to:

send a request for the location of data on the shared drive through the electronic discovery system, and wherein the shared drive is a third party shared drive;

receive a response indicating the location of the data on the shared drive through the electronic discovery system;

identify the location of the data at a node in a shared drive, wherein the data is the data at the node and all of the associated hierarchal data located below the node;

capture the data from the shared drive;

reassemble the data captured into usable data with a file name that can be identified and searched by the electronic discovery system based on a custodian, case, or data; and transfer the data to the electronic discovery system.

16. The system of claim 15, wherein the processing device is further configured to execute computer-readable program code to:

identify metadata associated with the data captured from the shared drive;

capture the metadata associated with the data from the shared drive; and reconstruct the data captured from the shared drive into accessible data for the electronic discovery system by utilizing the information contained in the metadata in order to reassemble the data captured into usable data.

17. The system of claim 15, wherein the processing device configured to execute computer-readable program code to send the inquiry comprises code to:

send an inquiry to a custodian requesting the location of the data on the shared drive.

18. The system of claim 15, wherein the processing device is further configured to execute computer-readable program code to receive the location of the shared drive comprises code to:

receive from a custodian a location identifier indicating the node location of the data on the shared drive.

19. The system of claim 15, wherein the processing device is further configured to execute computer-readable program code to:

identify links to other data located outside of and associated with the data captured.

20. The system of claim 19, wherein the processing device is further configured to execute computer-readable program code to:

send a follow up inquiry to a custodian presenting the links to the other data to the custodian, wherein the custodian is asked if the other data should be captured.

21. The system of claim 19, wherein the processing device is further configured to execute computer-readable program code to:

receive from a custodian information indicating whether the other data associated with the links should be captured and transferred to the electronic discovery system.

22. A collection tool system, for collecting data from a shared drive for an electronic discovery system, comprising:

a memory device;

a communication device;

a processing device, operatively coupled to the memory device and the communication device, and configured to execute computer-readable program code to:

send a request for the location of data on the shared drive through the electronic discovery system, and wherein the shared drive is a third party shared drive;

receive a response indicating the location of the data on the shared drive through the electronic discovery system;

capture data from the shared drive;

identify metadata associated with the data captured from the shared drive;

capture the metadata associated with the data from the shared drive; and reconstruct the data captured from the shared drive into accessible data for the electronic discovery system by utilizing the information contained in the metadata in order to reassemble the data captured into usable data that can be searched based on a custodian, case, or data.

23. The system of claim 22, wherein the processing device is further configured to execute computer-readable program code to:

identify the location of data at a node in the shared drive, wherein the data is the data at a node location and all of the associated hierarchal data located below the node;

reassemble the data captured into usable data with a file name that can be identified and searched by the electronic discovery system using the reconstructed data from the information contained in the metadata; and transfer the data to the electronic discovery system.

24. The system of claim 22, wherein the processing device is further configured to execute computer-readable program code to send the inquiry comprises code to:

send an inquiry to a custodian requesting the location of the data on the shared drive, using the processing device.

25. The system of claim 22, wherein the processing device is further configured to execute computer-readable program code to receive the location of the shared drive comprises code to:

receive from a custodian a location identifier indicating a node location of the data on the shared drive.

26. The system of claim 22, wherein the processing device is further configured to execute computer-readable program code to:

identify links to other data located outside of and associated with the data captured.

27. The system of claim 26, wherein the processing device is further configured to execute computer-readable program code to:

send a follow up inquiry to a custodian presenting the links to the other data to the custodian, wherein the custodian is asked if the other data should be captured.

28. The system of claim 26, wherein the processing device is further configured to execute computer-readable program code to:

receive from a custodian information indicating whether the other data should be captured and transferred to the electronic discovery system.

29. A computer program product for a collection tool system, for collecting data from a shared drive for an electronic discovery system, the computer program product comprising at least one computer-readable medium having computer-readable program code portions embodied therein, the computer-readable program code portions comprising:

an executable portion configured for sending a request for the location of data on the shared drive through the electronic discovery system, and wherein the shared drive is a third party shared drive;

an executable portion configured for receiving a response indicating the location of the data on the shared drive through the electronic discovery system;

an executable portion configured for identifying the location of data at a node in a shared drive, wherein the data is the data at the node location and all of the associated hierarchal data located below the node;

an executable portion configured for capturing the data from the shared drive;

an executable portion configured for reassembling the data captured into usable data with a file name that can be identified and searched by the electronic discovery system based on a custodian, case, or data; and an executable portion configured for transferring the data to the electronic discovery system.

30. The computer program product of claim 29, further comprising:

an executable portion configured for identifying metadata associated with the data captured from the shared drive;

an executable portion configured for capturing the metadata associated with the data captured from the shared drive; and an executable portion configured for reconstructing the data captured from the shared drive into accessible data for the electronic discovery system by utilizing the information contained in the metadata in order to reassemble the data captured into usable data.

31. The computer program product of claim 30, wherein the executable portion configured for sending the inquiry comprises sending an inquiry to a custodian requesting the location of the data on the shared drive, using the processing device.

32. The computer program product of claim 30, wherein the executable portion configured for receiving the location of the shared drive comprises receiving from a custodian a location identifier indicating the node location of the data on the shared drive, using the processing device.

33. The computer program product of claim 30, further comprising:

an executable portion configured for identifying links to other data located outside of and associated with the data, using the processing device.

34. The computer program product of claim 33, further comprising:

an executable portion configured for sending a follow up inquiry to a custodian presenting the links to the other data to the custodian using the processing device, wherein the custodian is asked if the other data should be captured.

35. The computer program product of claim 33, further comprising:

receiving from a custodian information indicating whether the other data should be captured and transferred to the electronic discovery system, using the processing device.

36. A computer program product for a collection tool system, for collecting data from a shared drive for an electronic discovery system, the computer program product comprising at least one computer-readable medium having computer-readable program code portions embodied therein, the computer-readable program code portions comprising:

an executable portion configured for sending a request for the location of data on the shared drive through the electronic discovery system, and wherein the shared drive is a third party shared drive;

an executable portion configured for receiving a response indicating the location of the data on the shared drive through the electronic discovery system;

an executable portion configured for capturing data from the shared drive;

an executable portion configured for identifying metadata associated with the data captured from the shared drive;

an executable portion configured for capturing the metadata associated with the data from the shared drive; and an executable portion configured for reconstructing the data captured from the shared drive into accessible data for the electronic discovery system by utilizing the information contained in the metadata in order to reassemble the data captured into usable data that can be searched based on a custodian, case, or data.

37. The computer program product of claim 36, further comprising:

an executable portion configured for identifying the location of the data at the node in the shared drive, wherein the data is the data at a node location and all of the associated hierarchal data located below the node;

an executable portion configured for reassembling the data captured into usable data with a file name that can be identified and searched by the electronic discovery system using the reconstructed data from the information contained in the metadata; and an executable portion configured for transferring the data to the electronic discovery system using the processing device.

38. The computer program product of claim 36, wherein the executable portion configured for sending the inquiry comprises sending an inquiry to a custodian requesting the location of the data on the shared drive, using the processing device.

39. The computer program product of claim 36, wherein the executable portion configured for receiving the location of the shared drive comprises receiving from a custodian a location identifier indicating the node location of the data on the shared drive, using the processing device.

40. The computer program product of claim 36, further comprising:

an executable portion configured for identifying links to other data located outside of and associated with the data, using the processing device.

41. The computer program product of claim 40, further comprising:

an executable portion configured for sending a follow up inquiry to a custodian presenting the links to the other data to the custodian, using the processing device, wherein the custodian is asked if the other data should be captured.

42. The computer program product of claim 40, further comprising:

receiving from a custodian information indicating whether the other data should be captured and transferred to the electronic discovery system, using the processing device.

* * * * *